(12) United States Patent
Eguchi et al.

(10) Patent No.: US 9,161,096 B2
(45) Date of Patent: Oct. 13, 2015

(54) WIRELESS TRANSMISSION SYSTEM, RELAY DEVICE, WIRELESS SINK DEVICE, AND WIRELESS SOURCE DEVICE

(71) Applicant: Sharp Kabushiki Kaisha, Osaka-shi, Osaka (JP)

(72) Inventors: Yohichi Eguchi, Osaka (JP); Keisuke Tsuji, Osaka (JP); Ryosuke Ohmae, Osaka (JP); Masayuki Etoh, Osaka (JP); Seiji Imanishi, Osaka (JP); Shinichi Katoh, Osaka (JP); Takuya Kinoshita, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/523,276

(22) Filed: Oct. 24, 2014

(65) Prior Publication Data

US 2015/0046955 A1 Feb. 12, 2015

Related U.S. Application Data

(60) Continuation of application No. 14/079,011, filed on Nov. 13, 2013, now Pat. No. 8,898,710, which is a division of application No. 13/256,791, filed as application No. PCT/JP2009/068158 on Oct. 22, 2009, now Pat. No. 8,613,029.

(30) Foreign Application Priority Data

Mar. 16, 2009 (JP) ................................. 2009-063207

(51) Int. Cl.
*H04N 7/18* (2006.01)
*H04N 21/647* (2011.01)
(Continued)

(52) U.S. Cl.
CPC ...... *H04N 21/64753* (2013.01); *H04L 12/4625* (2013.01); *H04N 21/43635* (2013.01); *H04N 21/43637* (2013.01); *H04N 21/64746* (2013.01)

(58) Field of Classification Search
CPC ............ H04N 21/436; H04N 21/4363; H04N 21/43637; H04N 21/63; H04N 21/633
USPC .................................. 725/74, 78, 80, 81, 141
See application file for complete search history.

(56) References Cited

U.S. PATENT DOCUMENTS 6,396,814 B1   5/2002   Iwamura et al.
6,728,231 B1 *  4/2004   Sugaya et al. ................ 370/336
(Continued)

FOREIGN PATENT DOCUMENTS

GB   2009/0089842   4/2009
JP   4-13318 A      1/1992
(Continued)

OTHER PUBLICATIONS

U.S. Final Office Action mailed May 1, 2013 for related U.S. Appl. No. 13/256,791.
(Continued)

*Primary Examiner* — James R Sheleheda
(74) *Attorney, Agent, or Firm* — Birch, Stewart, Kolasch & Birch, LLP

(57) ABSTRACT

A wireless transmission system is provided that can minimize the control command transmission amount by operating a plurality of sink devices in conjunction with each other with respect to each group. The wireless transmission system includes: a bridge device (1) which wireless-transmits an AV content; and a plurality of wireless sink devices (5, 6) which reproduce the wireless-transmitted AV content. The bridge device (1) has a group identification table which stores a group identifier for identifying a group formed by the wireless sink device (5, 6). The bridge device (1) adds a group identifier extracted from the group identification table to a control command for controlling the sink devices (5, 6) and wireless-transmits the control command having the group identifier. The wireless sink devices (5, 6) receive a control command wireless-transmitted from the bridge device (1) if a corresponding group identifier is added to the control command.

1 Claim, 13 Drawing Sheets

(51) Int. Cl.
*H04L 12/46* (2006.01)
*H04N 21/4363* (2011.01)

(56) References Cited

U.S. PATENT DOCUMENTS

| | | | |
|---|---|---|---|
| 7,216,159 B2 | 5/2007 | Hirose et al. | |
| 7,336,712 B1 | 2/2008 | Linnartz et al. | |
| 7,849,218 B2* | 12/2010 | Funabiki et al. | 709/245 |
| 7,904,593 B2* | 3/2011 | Ohkita | 709/245 |
| 8,019,999 B2* | 9/2011 | Candelore | 713/175 |
| 8,214,726 B2* | 7/2012 | Funabiki et al. | 714/786 |
| 8,613,029 B2* | 12/2013 | Eguchi et al. | 725/80 |
| 8,718,537 B2* | 5/2014 | Sakata et al. | 455/3.06 |
| 8,898,710 B2* | 11/2014 | Eguchi et al. | 725/80 |
| 2006/0117367 A1* | 6/2006 | Lyle | 725/114 |
| 2006/0154598 A1 | 7/2006 | Rudland et al. | |
| 2006/0209745 A1 | 9/2006 | MacMullan et al. | |
| 2006/0209890 A1 | 9/2006 | MacMullan et al. | |
| 2006/0232704 A1 | 10/2006 | Sutardja | |
| 2006/0248557 A1* | 11/2006 | Stark et al. | 725/37 |
| 2007/0076698 A1 | 4/2007 | Matsumoto | |
| 2007/0106899 A1 | 5/2007 | Suzuki | |
| 2007/0189202 A1 | 8/2007 | Asati et al. | |
| 2008/0063216 A1* | 3/2008 | Sakata et al. | 381/80 |
| 2008/0212699 A1* | 9/2008 | Imaeda et al. | 375/260 |
| 2008/0320539 A1* | 12/2008 | Ohkita | 725/118 |
| 2009/0031365 A1* | 1/2009 | Kwon et al. | 725/81 |
| 2009/0089842 A1* | 4/2009 | Perry et al. | 725/78 |
| 2009/0210539 A1* | 8/2009 | Funabiki et al. | 709/228 |
| 2009/0235304 A1* | 9/2009 | Hardacker et al. | 725/31 |
| 2009/0260043 A1 | 10/2009 | Tatsuta et al. | |
| 2009/0271530 A1* | 10/2009 | Ohkita | 710/3 |
| 2009/0285138 A1* | 11/2009 | Thomas et al. | 370/310 |
| 2009/0288130 A1* | 11/2009 | Ohkita | 725/127 |
| 2009/0322948 A1* | 12/2009 | Funabiki et al. | 348/571 |
| 2010/0071018 A1* | 3/2010 | Kabuto | 725/127 |
| 2010/0165912 A1* | 7/2010 | Funabiki et al. | 370/328 |
| 2010/0235483 A1* | 9/2010 | Kambhatla | 709/222 |
| 2011/0019623 A1* | 1/2011 | Funabiki et al. | 370/328 |
| 2011/0038338 A1* | 2/2011 | Funabiki et al. | 370/329 |
| 2013/0042291 A1* | 2/2013 | Kambhatla | 725/127 |
| 2013/0234913 A1* | 9/2013 | Thangadorai et al. | 345/2.1 |

FOREIGN PATENT DOCUMENTS

| | | |
|---|---|---|
| JP | 11-98137 A | 4/1999 |
| JP | 2000-115173 A | 4/2000 |
| JP | 2001-136586 A | 5/2001 |
| JP | 2002-189707 A | 7/2002 |
| JP | 2006-527560 A | 11/2006 |
| JP | 2006-340339 A | 12/2006 |
| JP | 2007-97044 A | 4/2007 |
| JP | 2008-131209 A | 6/2008 |
| JP | 2008-153728 A | 7/2008 |
| JP | 2008-153826 A | 7/2008 |
| JP | 2008-533913 A | 8/2008 |
| JP | 4192328 B2 | 12/2008 |
| JP | 2009-4877 A | 1/2009 |
| JP | 2010-259118 A | 11/2010 |
| JP | 2010-279072 A | 12/2010 |
| RU | 2232482 C2 | 7/2004 |
| WO | WO 2004/109974 A1 | 12/2004 |
| WO | WO 2007/037379 A1 | 4/2007 |
| WO | WO 2007/136038 A1 | 11/2007 |

OTHER PUBLICATIONS

U.S. Office Action mailed Jan. 22, 2013 for related U.S. Appl. No. 13/256,791.

* cited by examiner

FIG. 2
(A)
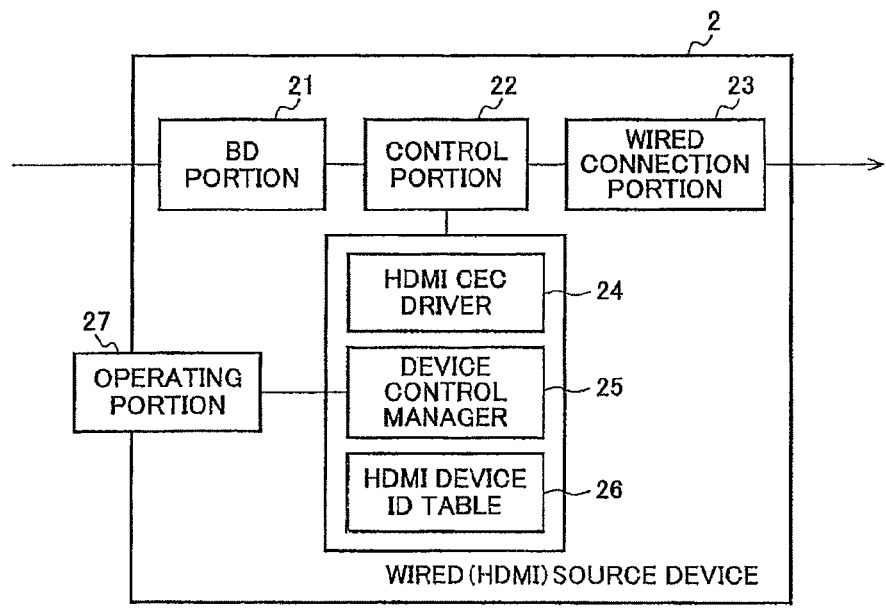
(B)
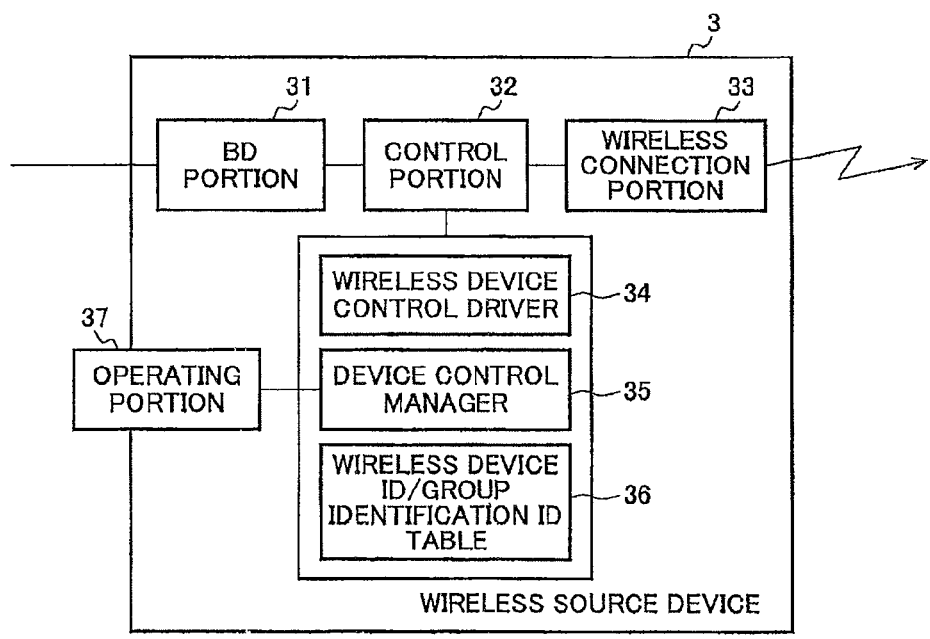

FIG. 3
(A)
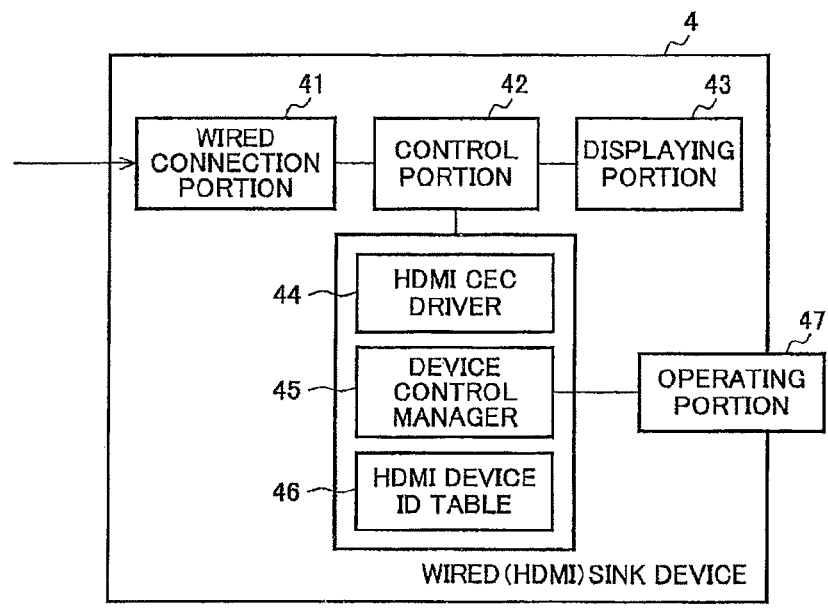
(B)
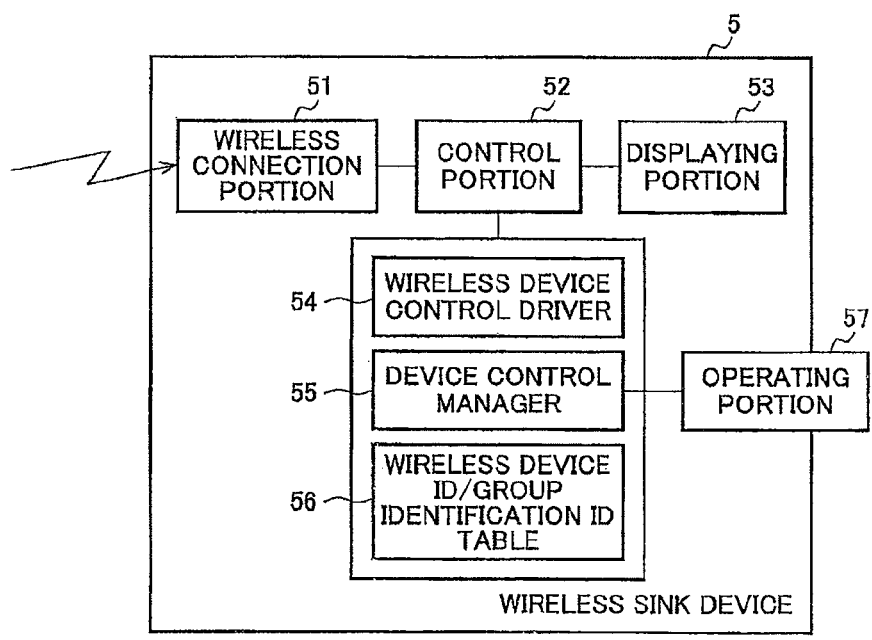

| HDMI DEVICE | PHYSICAL ADDRESS | LOGIC ADDRESS | DETERMINATION STEP |
|---|---|---|---|
| BRIDGE DEVICE | 0.0.0.0 | 0 | (1) |
| HDMI SOURCE DEVICE | 1.0.0.0 | 4 | (1) |
| BRIDGE DEVICE (FOR AUDIO) | 0.0.0.0 | 5 | (5) |

~7a (B)

| WIRELESS DEVICE | GROUP IDENTIFICATION ID | DEVICE ID | DETERMINATION STEP |
|---|---|---|---|
| BRIDGE DEVICE | 0 | 0 | (1) |
| TELEVISION 1 | 1 | 1 | (2) |
| AUDIO 1 | 1 | 2 | (4),(6) |
| AUDIO 2 | 1 | 3 | (4),(6) |
| TELEVISION 2 | 2 | 4 | — |
| AUDIO 3 | 2 | 5 | — |

~7b ered.
WIRELESS TRANSMISSION SYSTEM, RELAY DEVICE, WIRELESS SINK DEVICE, AND WIRELESS SOURCE DEVICE This application is a Continuation of co-pending U.S. patent application Ser. No. 14/079,011 filed on Nov. 13, 2013, which is a Divisional of U.S. patent application Ser. No. 13/256,791 filed Sep. 15, 2011 and issued as U.S. Pat. No. 8,613,029 B2 on Dec. 17, 2013, which is a National Phase of PCT/JP2009/068158 filed on Oct. 22, 2009, which claims priority under 35 U.S.C. 119(a) to Patent Application No. JP 2009-063207 filed in Japan on Mar. 16, 2009, all of which are hereby expressly incorporated by reference into the present application.

TECHNICAL FIELD

The present invention relates to a wireless transmission system, a relay device, a wireless sink device, and a wireless source device and more particularly to a wireless transmission system capable of grouping a plurality of sink devices and controlling operations of the sink devices with respect to each group, and a relay system, a wireless sink device, and a wireless source device making up the system.

BACKGROUND ART

A wireless network represented by a wireless LAN (local area network) is conventionally used for data transmission between devices such as personal computers (PC). Such a wireless network can be constructed so as to transmit data from an access point to devices through multicast transmission.

For example, Patent Document 1 discloses a wireless transmission apparatus that wirelessly communicates with other communication stations within a wireless network. This wireless transmission apparatus includes a wireless processing means that transmits and receives a wireless signal, and a control means that sets a predetermined frame cycle received by the wireless processing means based on management information from surrounding communication stations, that defines a predetermined position within the set frame cycle as a management information transmission area, that prescribes a plurality of slots in the management information transmission area to allow communication stations to transmit management information through one of the slots, that prescribes a portion of the slots as a new entry slot in advance, and that executes processing, for involving a transmission source of a specific signal in the wireless network when the specific signal is recognized at a predetermined new entry slot position.

If AV (audio visual) contents are transmitted by utilizing wireless transmission, the AV contents can be distributed through multicast transmission to a plurality of devices at the same time as described above. Not only a device having a display and a speaker integrated such as a television appliance (television) is available, but also a television and a plurality of speakers (e.g., 5.1-ch surround system) can be combined and utilized as devices on the side of receiving the distribution of AV contents (referred to as sink devices). Since such a form of utilization through the multicast transmission is difficult in a wired AV transmission mode such as conventional HDMI (High Definition Multimedia Interface), AV systems utilizing wireless transmission are likely to become widespread in the future.

PRIOR ART DOCUMENT

Patent Document

Patent Document 1: Japanese Patent Publication No. 4192328

SUMMARY OF THE INVENTION

Problems to be Solved by the Invention

If a sound volume, etc., are controlled in a wireless transmission system having a plurality of sink devices such as a television and speakers wirelessly connected to each other, a plurality of wirelessly connected sink devices must be considered as one set and these devices need to operate in conjunction with each other. For example, when a remote control for a television is used for increasing/decreasing a sound volume, the sound volumes of a plurality of speakers making a set with the television must change at the same time. Therefore, the television must wirelessly transmit a command for controlling a sound volume to each of a plurality of the speakers making the set. If a source device such as STB (set top box) or a recorder capable of outputting video is wirelessly connected to a plurality of sink devices, the source device must wirelessly transmit a control command to each of a plurality of the sink devices.

However, a transmission band is narrow in the case of wireless transmission as compared to wired transmission and, as a result, if a transmission amount of a control command is increased, problems occur such as a prolonged transmission time and variations generated in the timing of arrival of the control command at sink devices (e.g., a television and a plurality of speakers). Therefore, it is desirable to keep a transmission amount of the control command to the minimum necessary.

Although it is conceivable to construct a system by mixing an existing wired transmission mode such as HDMI and the wireless transmission mode described above, since transmission bands are different in the wireless transmission and the wired transmission, when a control command for sound volume control, etc., is sent in such a mixed system, a communication error may occur in the wireless transmission due to an insufficient transmission band even if the transmission amount is not a problem in the wired transmission. Therefore, the control command must be kept to the minimum necessary in a system mixing the wired transmission and the wireless transmission.

With regard to such problems, when a plurality of sink devices are operated in conjunction with each other, a conventional wireless transmission system individually sends the control command to each of the sink devices to be operated as described above, and a transmission amount of the control command cannot be kept to the minimum necessary. The same applies to the technique described in Patent Document 1, and the technique described in Patent Document 1 is a technique for involving a new communication station (receiver) in an existing wireless network and is not a technique for solving such problems.

The present invention was conceived in view of the situations and it is therefore an object of the present invention to provide a wireless transmission system capable of operating a plurality of sink devices in conjunction with each other with respect to each group to keep a transmission amount of a control command to the minimum necessary when performing wireless AV transmission, and a relay system, a wireless sink device, and a wireless source device making up the system.

In order to solve the above problems, a first technical means is a wireless transmission system comprising a content transmitting apparatus that wirelessly transmits AV contents including video and/or audio; and a plurality of sink devices that receive the wirelessly transmitted AV contents, at least one of the plurality of the sink devices being made up of a wireless sink device, wherein the content transmitting apparatus includes a group identification ID table that stores group identification ID for identifying a group made up of the plurality of the sink devices, a group identification ID adding portion that adds group identification ID extracted from the group identification ID table to a control command controlling the plurality of the sink devices, and a wireless transmitting portion that wirelessly transmits the control command with the group identification ID added, and the wireless sink device receives a control command wirelessly transmitted from the content transmitting apparatus if its own group identification ID is added to the control command.

A second technical means is the wireless transmission system of the first technical means wherein the content transmitting apparatus is made up of a wired source device and a relay device wired to the wired source device, and the relay device is wirelessly connected to the wireless sink device and mutually converts a wired control command communicated with the wired source device and a wireless control command communicated with the wireless sink device.

A third technical means is the wireless transmission system of the second technical means wherein the wired source device and the relay device are HDMI-connected, and the wired control command is a CEC message.

A fourth technical means is the wireless transmission system of the third technical means wherein the wired source device and the relay device include an HDMI device ID table that stores a logic address indicative of a device type and a physical address indicative of a device position.

A fifth technical means is the wireless transmission system of the second technical means wherein the plurality of the sink devices making up the group includes a television apparatus and one or more audio devices.

A sixth technical means is the wireless transmission system of the fifth technical means wherein if the relay device is wirelessly connected to the television apparatus and the television apparatus is wirelessly connected to the one or more audio devices, the group identification ID table is generated by an operation that the relay device assigns a group identification ID to the television apparatus when the television apparatus is powered on, and the television apparatus groups the audio devices based on device identification information unique to the audio devices and assigns the group identification ID to the grouped audio devices.

A seventh technical means is the wireless transmission system of the first technical means wherein the content transmitting apparatus is made up of a wireless source device and the plurality of the sink devices are made up of a wired sink device and a relay device wired to the wired source device, and the relay device functions as a wireless sink device wirelessly connected to the wireless source device and mutually converts a wireless control command communicated to/from the wireless source device and a wired control command communicated to/from the wired sink device.

An eighth technical means is the wireless transmission system of the seventh technical means wherein the relay device and the wired sink device are HDMI-connected, and wherein the wired control command is a CEC message.

A ninth technical means is the wireless transmission system of the eighth technical means wherein the relay device and the wired sink device include an HDMI device ID table that stores a logic address indicative of a device type and a physical address indicative of a device position.

A tenth technical means is the wireless transmission system of the seventh technical means wherein the plurality of the sink devices making up the group includes the relay device, a television apparatus, and one or more audio devices.

An eleventh technical means is the wireless transmission system of the tenth technical means wherein if the wireless source device is wirelessly connected to the relay device and the relay device is wirelessly connected to the one or more audio devices, the group identification ID table is generated by an operation that the wireless source device assigns a group identification ID to the relay device when the relay device is powered on, and the relay device groups the audio devices based on device identification information unique to the audio devices and assigns the group identification ID to the grouped audio devices.

A twelfth technical means is the wireless transmission system of the eleventh technical means wherein the relay device is wired to the television apparatus.

A thirteenth technical means is the wireless transmission system of the first technical means wherein the wireless sink device includes the group identification ID table and receives a control command wirelessly transmitted from another wireless sink device belonging to the same group if its own group identification ID is added to the control command.

A fourteenth technical means is the wireless transmission system of the first technical means wherein any one of the wireless sink devices belonging to the same group is defined as a representative wireless sink device, and the representative wireless sink device wirelessly communicates with the content transmitting apparatus or a representative wireless sink device of another group on behalf of the group to which the representative wireless sink device belongs.

A fifteenth technical means is the wireless transmission system of the fourteenth technical means wherein the representative wireless sink device communicates with other sink devices within the group to which the representative wireless sink device belongs.

A sixteenth technical means is the wireless transmission system of the fourteenth technical means wherein if a control command is broadcast-transmitted from the content transmitting apparatus, the representative wireless sink device receives the control command, integrates a plurality of responses of other sink devices within the group to which the representative wireless sink device belongs into one response based on a predetermined rule, and returns the integrated response to the content transmitting apparatus.

A seventeenth technical means is the wireless transmission system of the fourteenth technical means wherein a group identification ID stored in the group identification ID table is defined as a device ID of the representative wireless sink device.

An eighteenth technical means is a relay device making up the wireless transmission system of the second technical means, wherein the relay device relays AV contents transmitted from the wired source device to the wireless sink device.

A nineteenth technical means is a wireless sink device making up the wireless transmission system of the second technical means, wherein the wireless sink device receives AV contents transmitted from the wired source device via the relaying device.

A twentieth technical means is a relay device making up the wireless transmission system of the seventh technical means, wherein the relay device relays AV contents transmitted from the wireless source device to the wired sink device.

A twenty-first technical means is a wireless source device making up the wireless transmission system of the seventh technical means, wherein the wireless source device transmits AV contents to the wireless sink device, and to the wired sink device via the relaying device.

Effect of the Invention

According to the present invention, when wireless AV transmission is performed, a plurality of the sink devices are operated in conjunction with each other with respect to each group to keep a transmission amount of a control command to the minimum necessary and to prevent variations from occurring in the timing of arrival of the control command at the sink devices.

BRIEF DESCRIPTION OF DRAWINGS

FIG. 2 is a block diagram of an example of a source device making up the wireless transmission system of the present invention.

FIG. 3 is a block diagram of an example of a sink device making up the wireless transmission system of the present invention.

FIG. 7 is a diagram for explaining values of tables depicted in FIG. 4 and steps of FIG. 6 in a correlated manner.

MODES FOR CARRYING OUT THE INVENTION

Preferred embodiments according to a wireless transmission system of the present invention will now be described with reference to the accompanying drawings. Although HDMI (High Definition Multimedia Interface)-CEC (Consumer Electronics Control) is exemplarily illustrated as an example of a wired interface in the following description, this is not a limitation and, for example, a wired interface such as IEEE 1394 is also applicable.

Figure 1:
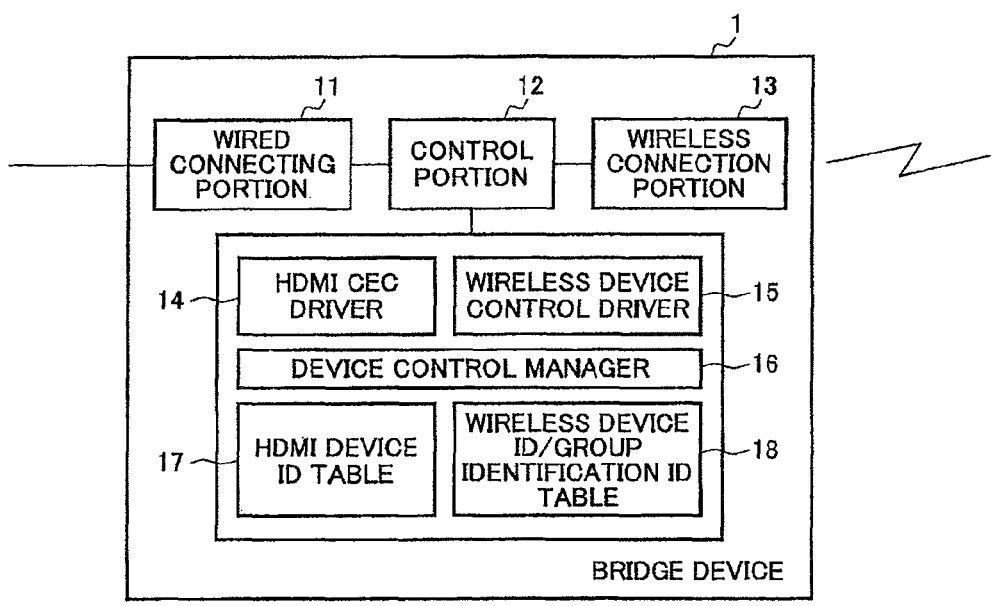
FIG. 1 is a block diagram of an example of a relay device making up a wireless transmission system of the present invention.

FIG. 1 is a block diagram of an example of a relay device making up a wireless transmission system of the present invention and, in FIG. 1, a relay device (hereinafter, a bridge device) is denoted by 1. The bridge device 1 includes a wired connecting portion 11 for communicably connecting to a wired (HDMI) device, a control portion 12 that controls the bridge device 1, a wireless connecting portion 13 for communicably connecting to a wireless device, an HDMI-CEC driver 14 that transmits/receives a CEC message that is an example of a wired control command, a wireless device control driver 15 that transmits/receives a wireless control command, a device control manager 16 that analyzes and mutually converts a CEC message and a wireless control command, an HDMI device ID table 17 that correlates and stores a logic address and a physical address of an HDMI device, and a wireless device ID/group identification ID table 18 that correlates and stores an ID unique to a wireless device and a group identification ID for identifying a group to which each wireless device belongs.

The bridge device 1 supports both configurations of FIGS. 4 and 10 described later; in the case of an example of FIG. 4, the relay from wired transmission to wireless transmission is performed such that AV contents transmitted from a wired device are transmitted to a wireless device; and in the case of an example of FIG. 10, the relay from wireless transmission to wired transmission is performed such that AV contents transmitted from a wireless device are transmitted to a wired device.

The bridge device 1 connects an HDMI device to the wired connecting portion 11 through wired connection, connects a wireless device to the wireless connecting portion 13 through wireless connection, and mutually converts control commands (a CEC message and a wireless control command) between the HDMI device and the wireless device to enable communication between them. An HDMI cable connecting the bridge device 1 and the HDMI device includes a TMDS (Transition Minimized Differential Signaling) line (digital signal line) for transmitting video/audio signals that are digital signals in a differential mode and a CEC line that is a bidirectional bus transmitting a control signal (CEC message) common to the devices. The HDMI cable also includes a DDC (Display Data Channel) line utilized for transmission of EDID (Extended Display Identification Data), HDCP (High-bandwidth Digital Content Protection system) authentication, etc.

A CEC message is a device control signal based on the CEC protocol of the HDMI standard. Various operational controls are realized between HDMI devices by exchanging the device control signal between the devices. In the case of CEC, a logic address (type of device) and a physical address (position of device) are acquired for each HDMI-connected device and, therefore, a CEC message can be transmitted to a desired device by specifying this logic address.

The logic address and the physical address in CEC will hereinafter briefly be described.

In the standard of HDMI-CEC, a plurality of logic addresses can be handled depending on type of device and have unique names in an HDMI network. These logic addresses are differentiated depending on type of HDMI device. For example, a logic address "0" denotes a displaying device such as a television; "4" denotes a reproducing device such as a BD player; and "5" denotes an audio device such as a speaker or an AV amplifier.

Although the physical address has a unique name in an HDMI network, a physical address (0.0.0.0) is normally assigned to a displaying device. If an HDMI device is added to or detached from an HDMI network, the physical address is automatically adjusted. The physical address has addresses for a plurality of layers including a displaying device, is made up of unique number n in the same layers, and is represented in the format of (n.n.n.n). If a layer of an HDMI device directly connected to the displaying device is a first layer, an HDMI device connected to the device of the first layer forms a second layer, and the layer number is increased with the distance from the displaying device. The physical address is described such that the layer number is increased from the left most n to the right in the above format (n.n.n.n).

Since an HDMI device has such a logic address and a physical address, a certain one device can be specified to transmit a CEC message even when a plurality of HDMI devices are connected to an HDMI network.

In FIG. 1, the wired connecting portion 11 and the wireless connecting portion 13 are connected to the control portion 12, and the HDMI-CEC driver 14, the wireless device control driver 15, the device control manager 16, the HDMI device ID table 17, and the wireless device ID/group identification ID table 18 are under the control of the control portion 12. The device control manager 16 receives a CEC message received by the HDMI-CEC driver 12 or a wireless control command received by the wireless device control driver 15.

The device control manager 16 converts a CEC message into a wireless control command and converts a wireless control command into a CEC message. The device control manager 16 specifies a destination (a device ID, a group identification ID) of the wireless control command after the conversion based on the wireless device ID/group identification ID table 18, and specifies a destination (a logic address) of the CEC message after the conversion based on the HDMI device ID table 17.

The wireless connecting portion 13 wirelessly transmits the wireless control command after the conversion to the destination specified by the device control manager 16. The wired connecting portion 11 transmits the CEC message after the conversion via wire to the destination specified by the device manager 16. The wireless connecting portion 13 and the wired connecting portion 11 can perform broadcast transmission without specifying destinations.

The HDMI device ID table 17 and the wireless device ID/group identification ID table 18 are generated by automatically exchanging predetermined commands when the devices are powered on and the wired connection and the wireless connection are enabled. An example of a sequence after power-on will be described later with reference to FIG. 6.

FIG. 2 is a block diagram of an example of a source device making up the wireless transmission system of the present invention. FIG. 2(A) depicts a wired (HDMI) source device and FIG. 2(B) depicts a wireless source device. These source devices are video output devices capable of outputting AV contents, are not limited to BD (Blu-ray Disc) players or BD recorders in this example, and may be STBs, DVD recorders, or DVD players, for example.

In FIG. 2(A), an HDMI source device 2 includes a BD portion 21 that drives an optical disc such as BD, a control portion 22 that controls the HDMI source device 2, a wired connecting portion 23 for communicably connecting to a wired (HDMI) device, an HDMI-CEC driver 24 that transmits/receives a CEC message, a device control manager 25 that analyzes a CEC message, an HDMI device ID table 26 that correlates and stores a logic address and a physical address of an HDMI device, and an operating portion 27 that includes a light-receiving portion receiving an operation signal from a remote controller (not depicted) and a body operating portion.

In FIG. 2(B), a wireless source device 3 includes a BD portion 31 that drives an optical disc such as BD, a control portion 32 that controls the wireless source device 3, a wireless connecting portion 33 for communicably connecting to a wireless device, a wireless device control driver 34 that transmits/receives a wireless control command, a device control manager 35 that analyzes a wireless control command, a wireless device ID/group identification ID table 36 that correlates and stores an ID unique to a wireless device and a group identification ID for identifying a group to which each wireless device belongs, and an operating portion 37 that includes a light-receiving portion receiving an operation signal from a remote controller (not depicted) and a body operating portion.

FIG. 3 is a block diagram of an example of a sink device making up the wireless transmission system of the present invention. FIG. 3(A) depicts a wired (HDMI) sink device and FIG. 3(B) depicts a wireless sink device. These sink devices are displaying devices capable of outputting video and/or audio out of AV contents transmitted from a source device and are televisions or monitors, for example. The sink devices may be audio devices capable of outputting audio out of AV contents transmitted from a source device and may be AV amplifiers or speakers, for example.

In FIG. 3(A), an HDMI sink device 4 includes a wired connecting portion 41 for communicably connecting to a wired (HDMI) device, a control portion 42 that controls the HDMI sink device 4, a displaying portion 43 such as LCD (liquid crystal display), an HDMI-CEC driver 44 that transmits/receives a CEC message, a device control manager 45 that analyzes a CEC message, an HDMI device ID table 46 that correlates and stores a logic address and a physical address of an HDMI device, and an operating portion 47 that includes a light-receiving portion receiving an operation signal from a remote controller (not depicted) and a body operating portion.

In FIG. 3(B), a wireless sink device 5 includes a wireless connecting portion 51 for communicably connecting to a wireless device, a control portion 52 that controls the wireless sink device 5, a displaying portion 53 such as LCD, a wireless device control driver 54 that transmits/receives a wireless control command, a device control manager 55 that analyzes a wireless control command, a wireless device ID/group identification ID table 56 that correlates and stores an ID unique to a wireless device and a group identification ID for identifying a group to which each wireless device belongs, and an operating portion 57 that includes a light-receiving portion receiving an operation signal from a remote controller (not depicted) and a body operating portion.

In FIGS. 2 and 3, each of the devices retains ID information of other connected devices (wired connection or wireless connection) in a table as is the case with the bridge device 1. The ID information is retained in the HDMI device ID table in the case of the HDMI devices and in the wireless device ID/group identification ID table in the case of the wireless devices. The ID information retained in these tables is generated by automatically exchanging predetermined commands when respective connections are enabled by power-on as is the case with the bridge device 1. The contents of the tables are the same as those of the tables in connected devices.

The present invention is mainly characterized by operating a plurality of sink devices in conjunction with each other with respect to each group to keep a transmission amount of a control command to the minimum necessary when wireless AV transmission is performed. For this purpose, the wireless transmission system includes a content transmitting apparatus that wirelessly transmits AV contents including video and/or audio and a plurality of sink devices that receive the wirelessly transmitted AV contents, and at least one of a plurality of the sink devices is made up of a wireless sink device. For example, if a plurality of the sink devices are made up of a television and a plurality of speakers, the television and the speakers can extract video and audio, respectively, from AV contents that are multicast-transmitted from a content reproducing apparatus and, therefore, a plurality of the sink devices can reproduce video and audio at the same time.

The content transmitting apparatus takes two major forms, which are a first form made up of the wired source device 2 and the bridge device 1 and a second form made up only of the wireless source device 3. Describing the first form as a representative example, the bridge device 1 (FIG. 1) making up the content transmitting apparatus includes the wireless device ID/group identification ID table 18 corresponding to a group identification ID table that stores a group identification ID for identifying a group made up of a plurality of sink devices, the device control manager 16 corresponding to a group identification ID adding portion that adds a group identification ID extracted from the wireless device ID/group identification ID table 18 to a control command for controlling a plurality of sink devices, and a wireless connecting portion corresponds to a wireless transmitting portion that wirelessly transmits the control command with the group identification ID added. The same applies to the case of the second form of the content transmitting apparatus made up of the wireless source device 3 (FIG. 2(B)).

Therefore, a group is formed by organizing a plurality of sink devices (e.g., a television apparatus and one or more audio devices) connected through wireless AV transmission. If the sink devices must be operated in conjunction with each other with respect to this group, the control command with the group identification ID added is wirelessly transmitted. A wireless sink device is configured to receive a control command if the control command is destined to its own group and to perform the operation in accordance with the received control command. As a result, when wireless AV transmission is performed, a plurality of the sink devices can be operated in conjunction with each other with respect to each group to keep a transmission amount of a control command to the minimum necessary and to prevent variations from occurring in the timing of arrival of the control command at the sink devices.

Alternatively, any one of wireless sink devices belonging to a group may be defined as a representative wireless sink device. The representative wireless sink device can wirelessly communicate, as a representative of the group to which the representative wireless sink device belongs, with the content transmitting apparatus (the bridge device 1 or the wireless source device 3) or a representative wireless sink device of another group. Providing this representative device produces effects such as enabling the devices in a group to operate in conjunction with each other and to integrate the responses to the source side, for example.

The control command of the wireless transmission mode includes, for example, a device-specific command issued to a certain device, a broadcast command issued to all the groups without specifying a destination device, and a group-addressed command issued to a certain group. When receiving a command requiring a reply (e.g., an inquiry command), a device returns a reply (response) to a command transmission source.

The control command (CEC message, in the case of HDMI) of the wired transmission mode includes, for example, a device-specific command issued to a certain device and a broadcast command issued to all the connected devices without specifying a destination device. Similarly, when receiving a command requiring a reply (such as an inquiry command), a device returns a response to a command transmission source.

First Embodiment

In this embodiment, as described above, the content transmitting apparatus is made up of the HDMI source device 2 and the bridge device 1 and all of a plurality of sink devices are made up of wireless sink devices (a television apparatus and one or more audio devices). In this case, the bridge device 1 is wirelessly connected to all the wireless sink devices.

Figure 4:
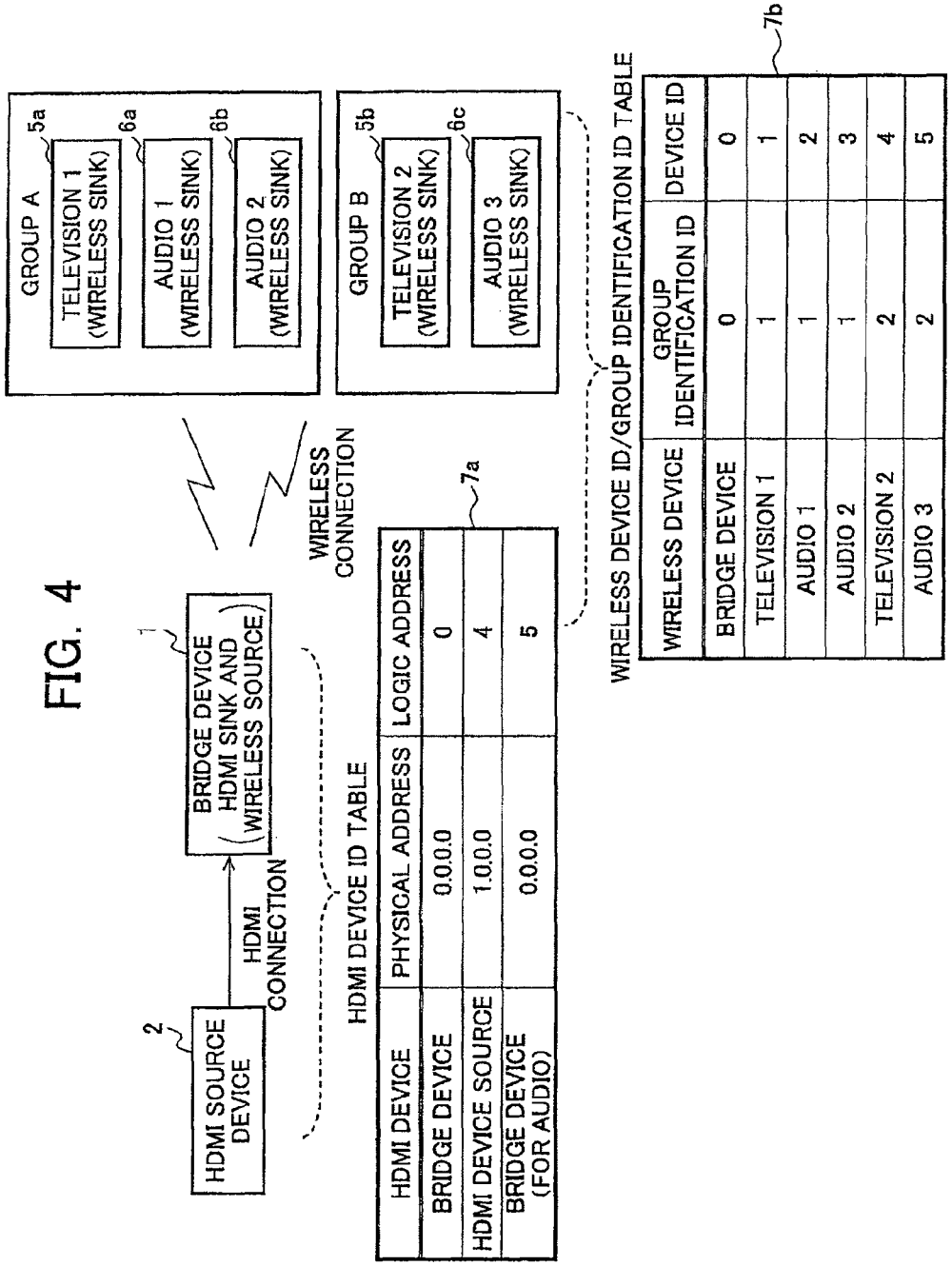
FIG. 4 is a diagram of an exemplary configuration of a wireless transmission system according to a first embodiment of the present invention.

FIG. 4 is a diagram of an exemplary configuration of a wireless transmission system according to a first embodiment of the present invention. In this example, the HDMI source device 2 and the bridge device 1 are HDMI-connected and the bridge device 1 is wirelessly connected to a plurality of wireless sink devices. In FIG. 4, televisions are denoted by 5a and 5b and audios are denoted by 6a to 6c. The televisions 5a, 5b, and the audios 6a to 6c are wireless sink devices and the televisions 5a and 5b have an apparatus configuration depicted in FIG. 3(B). The audios 6a to 6c are, for example, audio output devices such as speakers and AV amplifiers and are made up of a wireless connecting portion, a control portion, a wireless device control driver, a device control manager, a wireless device ID/group identification ID table, and an audio output portion.

In the case of this example, the HDMI source device 2 includes an HDMI device ID table 7a; the televisions 5a, 5b and the audios 6a to 6c include a wireless device ID/group identification ID table 7b; and the bridge device 1 includes the HDMI device ID table 7a and the wireless device ID/group identification ID table 7b. A method of generating these tables 7a and 7b will be described later with reference to FIG. 6. The television 5a and the audios 6a and 6b are categorized as a group A, and the television 5b and the audio 6c are categorized as a group B.

In the case of the first form, the televisions 5a, 5b, and the audios 6a to 6c that are wireless sink devices receive a control command wirelessly transmitted from the content transmitting apparatus (the bridge device 1) if their own group identification ID is added to the control command. This enables the wireless sink devices to operate in conjunction with the other wireless sink devices belonging to the same group based on the received control command.

The audios 6a to 6c are wireless sink devices, include the wireless device ID/group identification ID table 7b depicted in FIG. 4, and therefore can receive a control command wirelessly transmitted from the other wireless sink devices (the televisions 5a and 5b) belonging to the same group if their own group identification ID is added to the control command. In this case, the wireless sink devices can operate in conjunction with the other wireless sink devices belonging to the same group based on the received control command as described above.

Figure 5:
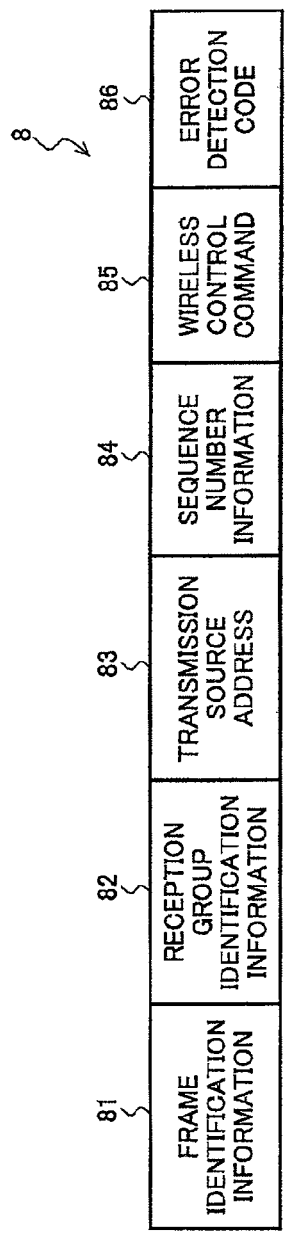
FIG. 5 is a diagram of an exemplary configuration of a packet for transmitting a wireless control command.

FIG. 5 is a diagram of an exemplary configuration of a packet for transmitting a wireless control command and, in FIG. 5, a transmission packet is denoted by 8. A frame format of the transmission packet 8 is made up of fields such as frame identification information 81, reception group identification information 82, a transmission source address 83, sequence number information 84, a wireless control command 85, and an error detection code 86.

The frame identification information 81 is information specifying a type of data. For example, in the case of wireless LAN, the identification information is distinguished in accordance with a purpose of control (such as data communication, management, band reservation, and acknowledgement). The reception group identification information 82 is information specifying a receiving group (group identification ID). A wireless sink device receives the subsequent fields of the packet 8 based on this information if identical to its own group. If a control command is transmitted to a particular device, the device ID of the destination device must be specified and, therefore, a field for specifying this device ID is separately provided. Alternatively, a field for device ID may also be used as a field of the reception group identification information 82.

The transmission source address 83 indicates the address of the wireless source device that is the transmission source, etc. The sequence number information 84 is used for determining duplication in the case of communication including a retransmission processing or is used by a receiver (a sink device) for detecting that a number is skipped in the case of communication not including a retransmission processing. The sequence number information 84 may not be included in this frame format.

The wireless control command 85 provides various control data for controlling the sink devices. Communication control data may be included if management of network formation etc., is performed. The error detection code 86 is data for determining whether transmission data has an error, such as CRC (cyclic redundancy check).

Figure 6:
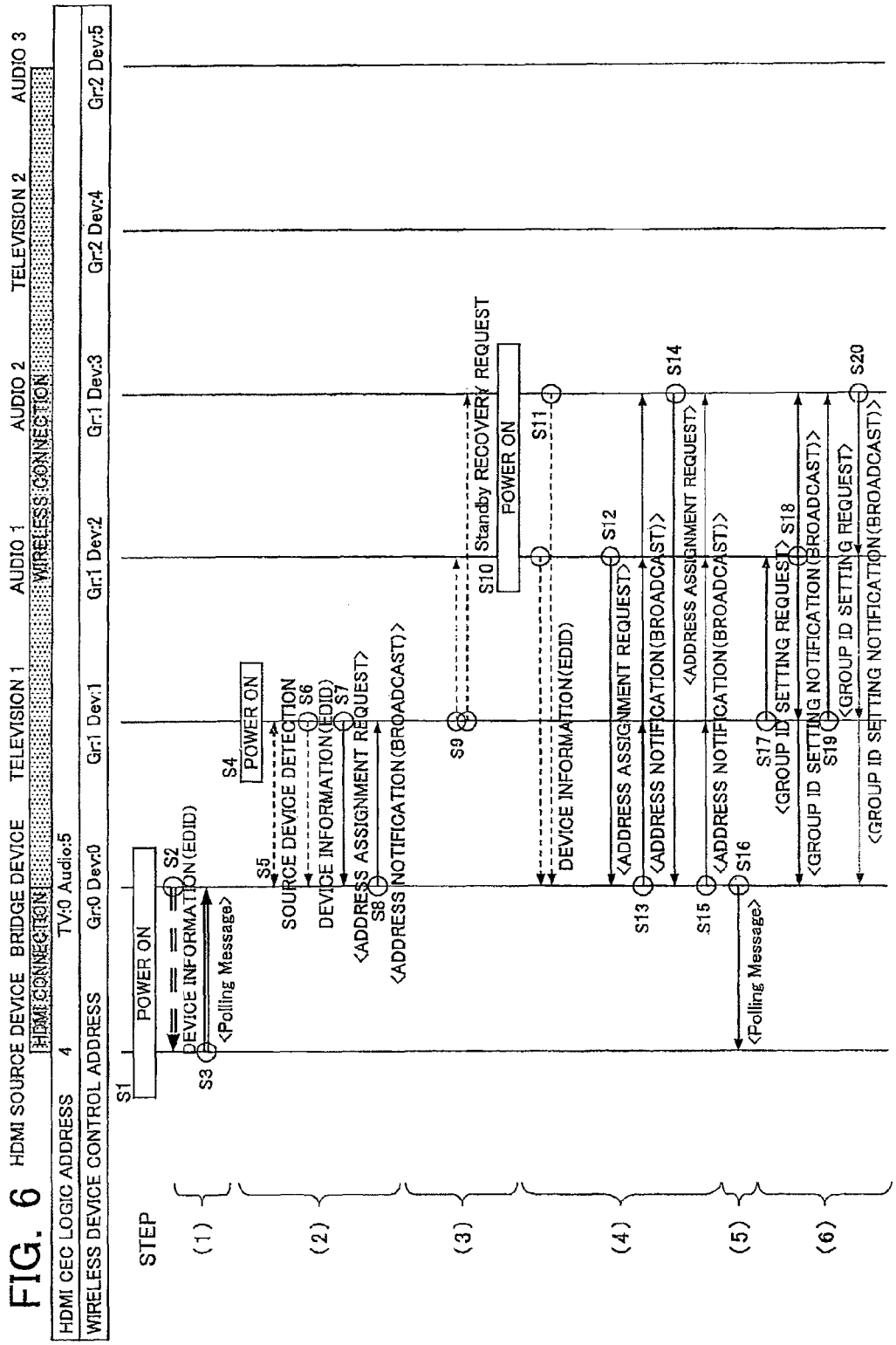
FIG. 6 is a diagram of an example of a sequence at the time of power-on in the wireless transmission system according to the first embodiment of the present invention.

FIG. 6 is a diagram of an example of a sequence at the time of power-on in the wireless transmission system according to the first embodiment of the present invention. This sequence example corresponds to the system configuration of FIG. 4 and will be described by exemplarily illustrating the bridge device 1 generating the HDMI device ID table 7a and the wireless device ID/group identification ID table 7b depicted in FIG. 4 described above. In FIG. 6, a single line indicates a wireless control command; a double line indicates a CEC message; a broken line indicates a command other than device control; a circle indicates a command transmission source; and an arrow indicates a command destination. It is assumed that the HDMI source device 2, the bridge device 1, the television 5a, the audio 6a, the audio 6b, the television 5b, and the audio 6c of FIG. 4 respectively correspond to an HDMI source device, a bridge device, a television 1, an audio 1, an audio 2, a television 2, and an audio 3 of FIG. 6.

In FIG. 6, it is assumed that "HDMI CEC logic address" corresponds to the logic address of the HDMI device ID table 7a depicted in FIG. 4 and that "wireless device control address" corresponds to a group identification ID (Gr) and a device ID (Dev) of the wireless device ID/group identification ID table 7b depicted in FIG. 4.

First, when the HDMI source device and the bridge device are powered on (S1), the bridge device transmits the physical address (0.0.0.0) of a television as device information to the HDMI source device so as to virtually fulfill a role of the television 1 through the HDMI connection (S2). As a result, the physical address of the bridge device is determined as (0.0.0.0) and the physical address of the HDMI source device is determined as (1.0.0.0). The HDMI source device transmits the logic address "4" of a reproducing device through a CEC message <Polling Message> so as to declare that the HDMI source device is a reproducing device (S3). If this causes no Ack, the address is decided without change. The group identification ID and the device ID of the bridge device are set to "0", respectively, by default.

When the television 1 is powered on (S4), the television 1 detects the presence of the HDMI source device via the bridge device (S5) and transmits the device information of the television 1 to the bridge device (S6). The television 1 transmits to the bridge device a wireless control command that requests address assignment (S7) and the bridge device performs broadcast transmission of a wireless control command for notification of address (S8). As a result, the television 1 acquires the group identification ID "1" and the device ID "1" as an address.

The television 1 transmits a request for recovery from standby state (power-on request) to the audio devices making up a group (S9). In this case, it is assumed that the television 1 stores the MAC (Media Access Control) addresses of the audios 1 and 2 in advance and recognizes that these audio devices are in the same group. The audios 1 and 2 are powered on in accordance with the request for recovery from the television (S10) and then transmit respective pieces of device information to the bridge device (S11).

The audio 1 transmits to the bridge device a wireless control command that requests address assignment (S12) and the bridge device performs broadcast transmission of a wireless control command for notification of address (S13). As a result, the audio 1 acquires the group identification ID "0" and the device ID "2" as an address. This group identification ID "0" represents default. Similarly, the audio 2 transmits to the bridge device a wireless control command that requests address assignment (S14) and the bridge device performs broadcast transmission of a wireless control command for notification of address (S15). As a result, the audio 2 acquires the group identification ID "0 (default)" and the device ID "3" as an address.

Because the audio devices exist on the wireless side, the bridge device transmits the logic address "5" of audio device to the HDMI source device through a CEC message <Polling Message> (S16). If this causes no Ack, the address is decided without change.

The television 1 transmits to the audio 1 a wireless control command that requests setting of the group identification ID "1" (S17), and the audio 1 sets the group identification ID "1" in accordance with this request and then performs broadcast transmission of a group ID setting notification (S18). Similarly, the television 1 transmits to the audio 2 a wireless control command that requests setting of the group identification ID "1" (S19), and the audio 2 sets the group identification ID "1" in accordance with this request and then performs broadcast transmission of a group ID setting notification (S20).

In other words, when the television 1 is powered on, the bridge device assigns a group identification ID to the television 1 (S8), and the television 1 groups the audios 1 and 2 based on the device identification information (such as MAC address) unique to the audios 1 and 2 and assigns the group identification ID to the grouped audios 1 and 2 (S17, S19). This process leads to the generation of the wireless device ID/group identification ID table 7b. The table is generated by the same process for the other group.

The tables 7a and 7b depicted in FIG. 4 are generated in this way by the sequence described with reference to FIG. 6.

FIG. 7 is a diagram for explaining the values of the tables depicted in FIG. 4 and the steps of FIG. 6 in a correlated manner. In the case of table 7a depicted in FIG. 7(A), the physical addresses and the logic addresses of the bridge device and the HDMI source device are determined at step (1) of FIG. 6. This step (1) is a step of powering on the HDMI device to configure the HDMI network, corresponding to S1 to S3. The physical address and the logic address of the bridge device (for audio) are determined at step (5) of FIG. 6. This step (5) is a step of notifying the HDMI source device of the connection of the audio devices, corresponding to S16.

In the case of the table 7b depicted in FIG. 7(B), the group identification ID and the device ID of the bridge device are determined at step (1) of FIG. 6. The group identification ID and the device ID of the television 1 are determined at step (2) of FIG. 6. This step (2) is a step of powering on the television 1, which is a wireless device, for connecting to the bridge device, corresponding to S4 to S8. The group identification IDs and the device IDs of the audios 1 and 2 are determined at steps (4) and (6) of FIG. 6. This step (4) is a step of powering on the audios 1 and 2 for connecting to the bridge device, corresponding to S10 to S15. Step (6) is a step of setting the group identification IDs to the audios 1 and 2, corresponding to S17 to S20. The group identification IDs and the device IDs for the television 2 and the audio 3 of the group B can be acquired in the same method and therefore will not be described.

Figure 8:
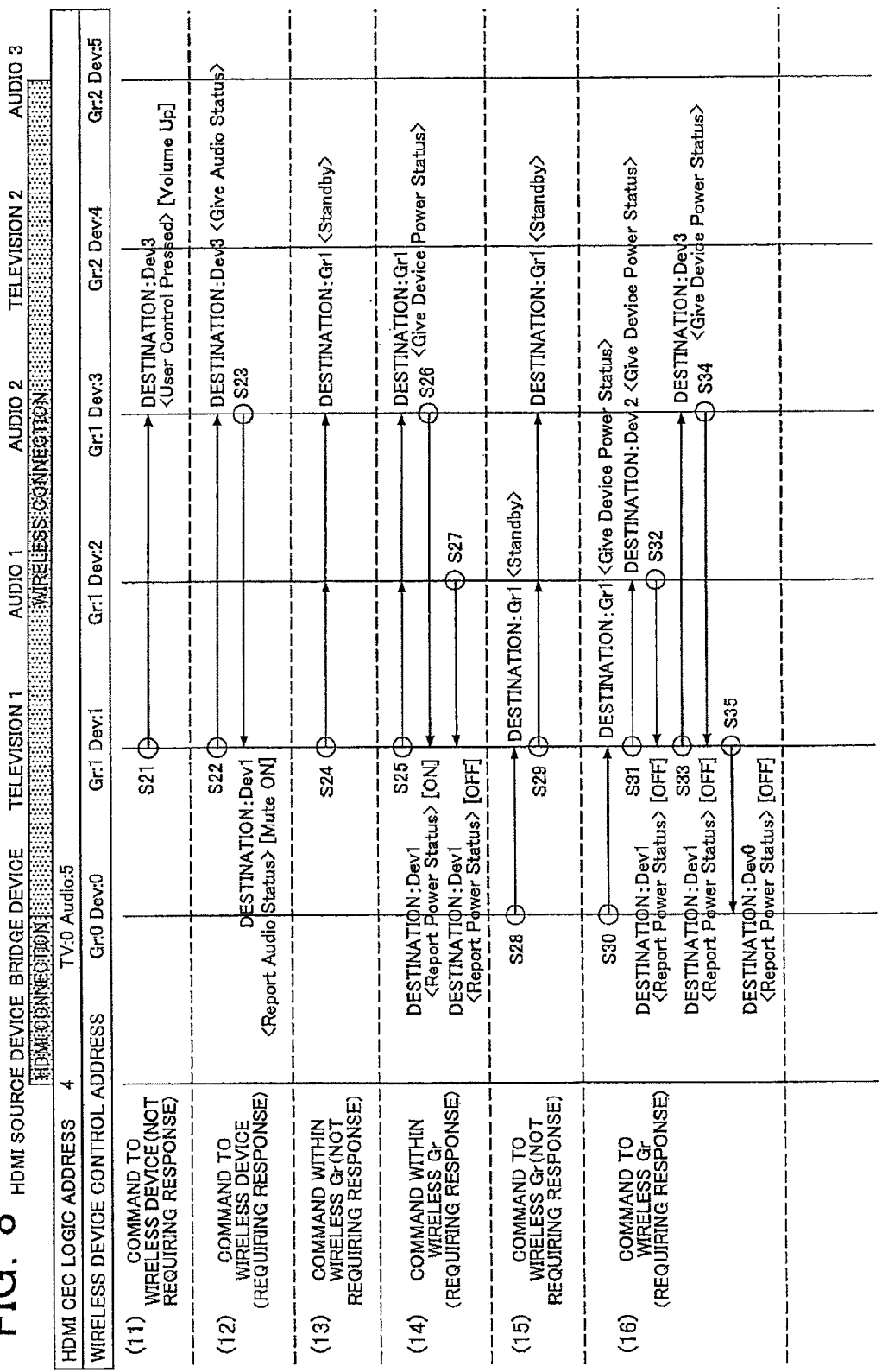
FIG. 8 is a diagram of an example of communication procedures in the wireless transmission system according to the first embodiment of the present invention.

FIG. 8 is a diagram of an example of communication procedures in the wireless transmission system according to the first embodiment of the present invention. The procedures of the following description are executed in the wireless transmission system depicted in FIG. 4 described above, based on the HDMI device ID table 7a and the wireless device ID/group identification ID table 7b. A procedure (11) is a procedure in the case of transmitting a wireless control command (not requiring a response) to a wireless device and represents an example when the television 1 performs the sound volume operation for the audio 2. The television 1 transmits a wireless control command <User Control Pressed> [Volume Up] for controlling a sound volume by designating the device ID "3" (Dev3) as the destination (S21). The audio 2 corresponding to the device ID "3" controls the sound volume in accordance with this wireless control command. Since a response is not required in this case, the audio 2 returns no response.

A procedure (12) is a procedure in the case of transmitting a wireless control command (requiring response) to a wireless device and represents an example when the television 1 makes a status inquiry to the audio 2. The television 1 transmits a wireless control command <Give Audio Status> for inquiring about a status by designating the device ID "3" (Dev3) as the destination (S22). The audio 2 corresponding to the device ID "3" returns a wireless control command <Report Audio Status> [Mute ON] indicative of its own status as a response by designating the device ID "1" (Dev1) as the destination in accordance with this wireless control command (S23). Since a response is required in this case, the audio 2 returns a response.

A procedure (13) is a procedure in the case of transmitting a wireless control command (not requiring a response) to wireless devices within a group and represents an example when the television 1 makes a standby request to the audios 1 and 2 in the same group. The television 1 transmits a wireless control command <Standby> for making a standby request by designating the group identification ID "1" (Gr1) as the destination (S24). The audios 1 and 2 corresponding to the group identification ID "1" make the shift to the standby state in accordance with this wireless control command. Since a response is not required in this case, the audios 1 and 2 return no response.

A procedure (14) is a procedure in the case of transmitting a wireless control command (requiring a response) to wireless devices within a group and represents an example when the television 1 makes an inquiry about a power status to the audios 1 and 2. The television 1 transmits a wireless control command <Give Device Power Status> for inquiring about a power status by designating the group identification ID "1" (Gr1) as the destination (S25). The audio 2 corresponding to the group identification ID "1" returns a wireless control command <Report Power Status> [ON] indicative of its own power status as a response by designating the device ID "1" (Dev1) as the destination in accordance with this wireless control command (S26). Similarly, the audio 1 corresponding to the group identification ID "1" returns a wireless control command <Report Power Status> [OFF] indicative of its own power status as a response by designating the device ID "1" (Dev1) as the destination in accordance with this wireless control command (S27). Since a response is required in this case, the audios 1 and 2 return responses.

A procedure (15) is a procedure in the case of transmitting a wireless control command (not requiring a response) to wireless devices within a group and represents an example when the bridge device makes a standby request to the television 1 and the audios 1 and 2 in the group A (group identification ID "1"). The bridge device transmits a wireless control command <Standby> for making a standby request by designating as the group identification ID "1" (Gr1) as the destination (S28). In this example, a wireless control command from the outside of the group is received only by the television 1, which is the representative wireless sink device. The television 1 transfers the wireless control command <Standby> received from the bridge device by designating as the group identification ID "1" (Gr1) as the destination (S29). The television 1 and the audios 1 and 2 corresponding to the group identification ID "1" make the shift to the standby state in accordance with this wireless control command. Since a response is not required in this case, the television 1 and the audios 1 and 2 belonging to the group A return no response.

A procedure (16) is a procedure in the case of transmitting a wireless control command (requiring a response) to wireless devices within a group and represents an example when the bridge device 1 makes an inquiry about a power status to the television 1 and the audios 1 and 2 in the group A (group identification ID "1"). The bridge device transmits a wireless control command <Give Device Power Status> for inquiring about a power status by designating the group identification ID "1" (Gr1) as the destination (S30). In this example, a wireless control command from the outside of the group is received only by the television 1, which is the representative wireless sink device. The television 1 transfers the wireless control command <Give Device Power Status> received from the bridge device by designating the device ID "2" (Dev2) as the destination (S31). The audio 1 corresponding to the device ID "2" returns a wireless control command <Report Power Status> [OFF] indicative of its own power status as a response by designating the device ID "1" (Dev1) as the destination in accordance with this wireless control command (S32).

Similarly, the television 1 transfers the wireless control command <Give Device Power Status> received from the bridge device by designating the device ID "3" (Dev3) as the destination (S33). The audio 2 corresponding to the device ID "3" returns a wireless control command <Report Power Status> [OFF] indicative of its own power status as a response by designating the device ID "1" (Dev1) as the destination in accordance with this wireless control command (S34). The television 1 corresponding to this identification ID "1" integrates a plurality of responses received from the audios 1 and 2 into one response based on a predetermined rule and specifies the device ID "0" (Dev0) to return this response (S35). The bridge device corresponding to the device ID "0" receives this response.

As described with the procedures (15) and (16) of FIG. 8, any one of the wireless sink devices belonging to each group may be defined as a representative wireless sink device. The representative wireless sink device wirelessly communicates, as a representative of the group to which the representative wireless sink device belongs, with the content transmitting apparatus (the bridge device) or a representative wireless sink device of another group. The representative wireless sink device may wirelessly communicate with the other sink devices within the group. For example, as depicted in FIG. 4 described above, if an entire group is made up of wireless sink devices, the representative wireless sink devices are defined as the television 1, 2. Alternatively, as depicted in FIG. 10 described later, if a group includes a bridge device and the bridge device is HDMI-connected to a television apparatus, the representative wireless sink device is defined as the bridge device.

In the procedure (16), if the bridge device performs the broadcast transmission of the control command, the television 1 acting as the representative wireless sink device receives this control command, integrates a plurality of responses of the other sink devices (the audios 1, 2) in the group to which the television 1 belongs into one response based on a predetermined rule, and returns this reply to the bridge device.

This response returning method may be separated into two major cases. In a first case, the bridge device receives responses of the sink devices (the audios 1, 2, and 3) from the representative wireless sink devices (the televisions 1 and 2) of the groups in response to an inquiry command from the HDMI source device and returns the responses to the HDMI source device. In a second case, when receiving an inquiry command from the outside of a group, the representative wireless sink device (the television 1) transmits an inquiry command to the wireless sink devices (the audios 1 and 2) within the group, receives responses from the sink devices, and returns the response to the command issuer (corresponding to the procedure 16). In the second case, as described later in a second embodiment, the representative wireless sink device may be the bridge device and, in this case, an inquiry command is transmitted to a wired device connected to the bridge device within a group.

In this regard, a rule must be defined for integrating a plurality of responses into one response in the bridge device or the representative wireless sink device (the television or the bridge device). When the following response returning rule is defined by way of example, even if different responses are received from a plurality of sink devices, one response can be returned in the same way as when one sink device is connected. Therefore, devices can be controlled without recognizing a plurality of connections (multicast connection).

(Response Returning Rule)
1. In the case of a control command for inquiry about ON/OFF status (e.g., inquiry about a power status, a video display status, or an audio reproduction status), if one or more devices are "ON" among connected sink devices, "ON" is returned as a response; otherwise, "OFF" is returned.
2. In the case of a control command for inquiry about a numeric value (e.g., inquiry about volume), the maximum value of numeric values of connected sink devices is returned as a response.

Although an attribute of group identification ID is additionally assigned to each wireless sink device in addition to a device ID in the above description, the group identification ID stored in the wireless device ID/group identification ID table may be defined as the device ID of the representative wireless sink device. Sink devices of each group retain the device ID of the representative wireless sink device of their own group. In this case, the field of "group identification ID" of the wireless device ID/group identification ID table 7b depicted in FIG. 4 described above may be defined as "group representative device ID". For example, since the device ID of the television 1 which is the representative device is "1" in the table 7b, the audios 1 and 2 in the same group also retain this representative device ID "1". As a result, it is not necessary for the sink devices to have the separate attribute that means the group identification ID.

A sink device (audio device) not representative of a group exchanges a control command only with a representative device of a group and therefore may not retain the whole of the wireless device ID/group identification ID table 7b, and the same operation can be performed even if the sink device only retains its own device ID and group identification ID, and the device ID of the representative device.

Figure 9:
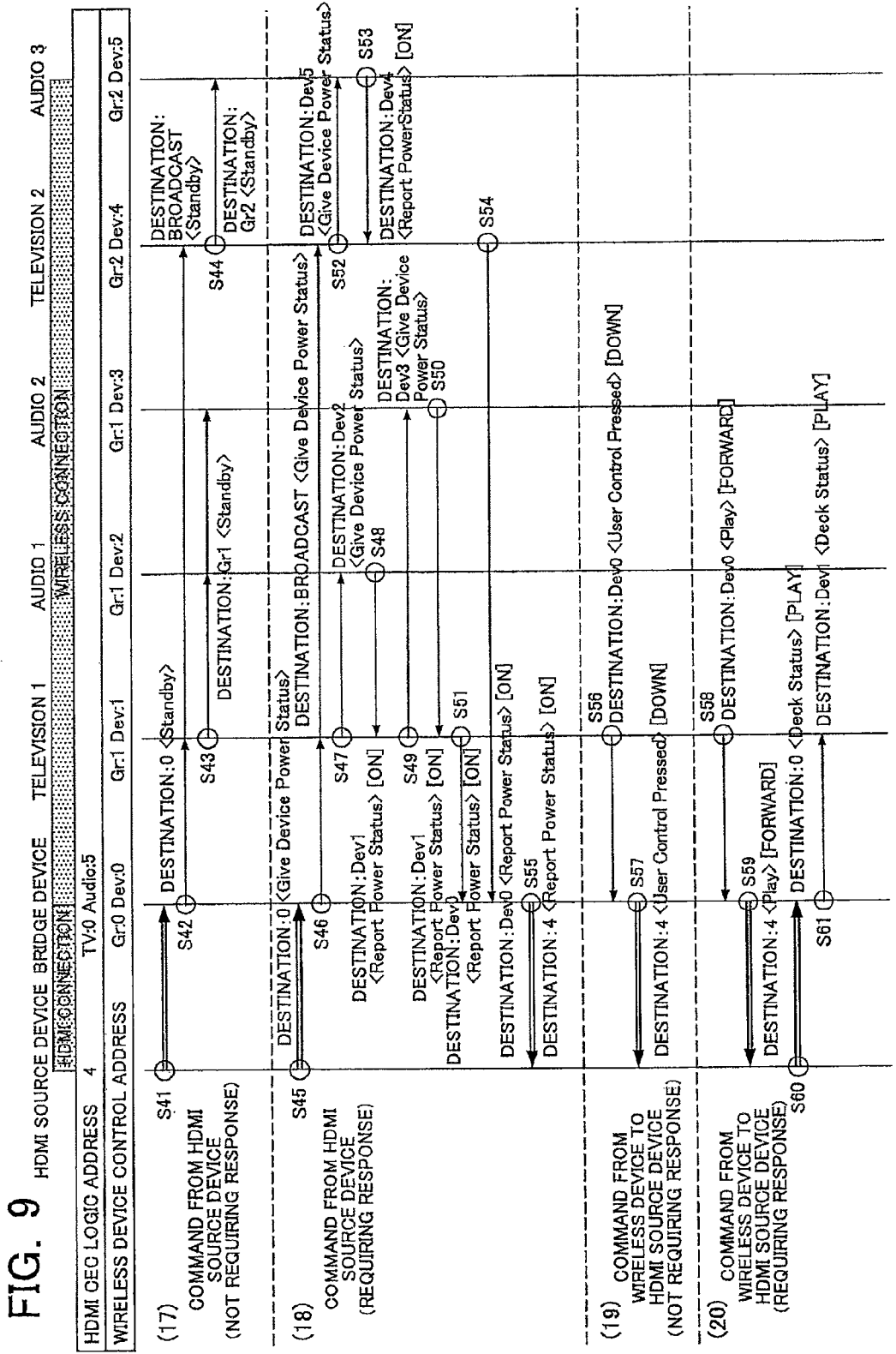
FIG. 9 is a diagram of another example of communication procedures in the wireless transmission system according to the first embodiment of the present invention.

FIG. 9 is a diagram of another example of communication procedures in the wireless transmission system according to the first embodiment of the present invention. The procedures of the following description are executed in the wireless transmission system depicted in FIG. 4 described above, based on the HDMI device ID table 7a and the wireless device ID/group identification ID table 7b.

A procedure (17) is a procedure in the case of transmitting a CEC message (not requiring a response) from the HDMI source device and represents an example when the HDMI source device makes a standby request to the devices of the groups A and B. The HDMI source device transmits a CEC message <Standby> for making a standby request by designating the logic address "0" (TV) as the destination (S41). The bridge device corresponding to this logic address converts this CEC message into a wireless control command and performs the broadcast transmission of the converted wireless control command <Standby> without specifying destinations (S42). In this example, the broadcast-transmitted wireless control command <Standby> is received only by the televisions 1 and 2, which are the representative wireless sink devices.

The television 1 transfers the wireless control command <Standby> received from the bridge device by designating the group identification ID "1" (Gr1) as the destination (S43). Similarly, the television 2 transfers the wireless control command <Standby> received from the bridge device by designating the group identification ID "2" (Gr2) as the destination (S44). The television 1 and the audios 1 and 2 corresponding to the group identification ID "1" and the television 2 and the audio 3 corresponding to the group identification ID "2" make the shift to the standby state in accordance with this wireless control command. Since a response is not required in this case, the devices belonging to the groups A and B return no response.

A procedure (18) is a procedure in the case of transmitting a CEC message (requiring a response) from the HDMI source device and represents an example when the HDMI source device makes an inquiry about a power status to the devices of the groups A and B. The HDMI source device transmits a CEC message <Give Device Power Status> for inquiring about a power status by designating the logic address "0" (TV) as the destination (S45). The bridge device corresponding to this logic address converts this CEC message into a wireless control command and performs the broadcast transmission of the converted wireless control command <Give Device Power Status> without specifying destinations (S46). In this example, the broadcast-transmitted wireless control command <Give Device Power Status> is received only by the televisions 1 and 2, which are the representative wireless sink devices.

The television 1 transfers the wireless control command <Give Device Power Status> received from the bridge device by designating the device ID "2" (Dev2) as the destination (S47). The audio 1 corresponding to this device ID "2" transmits a wireless control command <Report Power Status> [ON] as a response by designating the device ID "1" (Dev1) as the destination (S48). Similarly, the television 1 transfers the wireless control command <Give Device Power Status> by designating the device ID "3" (Dev3) as the destination (S49). The audio 2 corresponding to this device ID "3" transmits a wireless control command <Report Power Status> [ON] as a response by designating the device ID "1" (Dev1) as the destination (S50). The television 1 corresponding to this device ID "1" integrates the responses from the audios 1 and 2 into one response based on the response returning rule described above and transmits this wireless control command <Report Power Status> [ON] by designating the device ID "0" (Dev0) as the destination (S51).

The television 2 transfers the wireless control command <Give Device Power Status> received from the bridge device by designating the device ID "5" (Dev5) as the destination (S52). The audio 3 corresponding to this device ID "5" transmits a wireless control command <Report Power Status> [ON] as a response by designating the device ID "4" (Dev4) as the destination (S53). The television 2 corresponding to this device ID "4" transmits the wireless control command <Report Power Status> [ON] as a response from the audio 3 by designating the device ID "0" (Dev0) as the destination (S54).

The bridge device corresponding to this device ID "0" integrates the two responses from the television 1 and the television 2 into one response based on the response returning rule, converts this wireless control command <Report Power Status> [ON] into a CEC message, and transmits the converted CEC message <Report Power Status> [ON] by designating the logic address "4" as the destination (S55). The HDMI source device corresponding to this logic address receives the response from the bridge device.

A procedure (19) is a procedure in the case of transmitting a wireless control command (not requiring a response) from a wireless sink device to the HDMI source device and represents an example when a remote control signal is transmitted from the television 1 to the HDMI source device. The television 1 transmits a wireless control command <User Control Pressed> [DOWN] of the remote control signal by designating the device ID "0" (Dev0) as the destination (S56). The bridge device corresponding to the device ID "0" converts the wireless control command <User Control Pressed> [DOWN] from the television 1 into a CEC message and transmits the converted CEC message <User Control Pressed> [DOWN] by designating the logic address "4" as the destination (S57). The HDMI source device corresponding to this logic address receives the CEC message from the bridge device.

A procedure (20) is a procedure in the case of transmitting a wireless control command (requiring a response) from a wireless sink device to the HDMI source device and represents an example when a reproduction request is transmitted from the television 1 to the HDMI source device. The television 1 transmits a wireless control command <Play> [FORWARD] of the reproduction request signal by designating the device ID "0" (Dev0) as the destination (S58). The bridge device corresponding to the device ID "0" converts the wireless control command <Play> [FORWARD] from the television 1 into a CEC message and transmits the converted CEC message <Play> [FORWARD] by designating the logic address "4" as the destination (S59).

The HDMI source device corresponding to this logic address transmits a CEC message <Deck Status> [PLAY] as a response to the CEC message from the bridge device by designating the logic address "0" (TV) as the destination (S60). The bridge device corresponding to this logic address converts this CEC message into a wireless control command and transfers the converted wireless control command <Deck Status> [PLAY] by designating the device ID "1" (Dev1) as the destination (S61). The television 1 corresponding to this device ID "1" receives this response.

Second Embodiment

Figure 10:
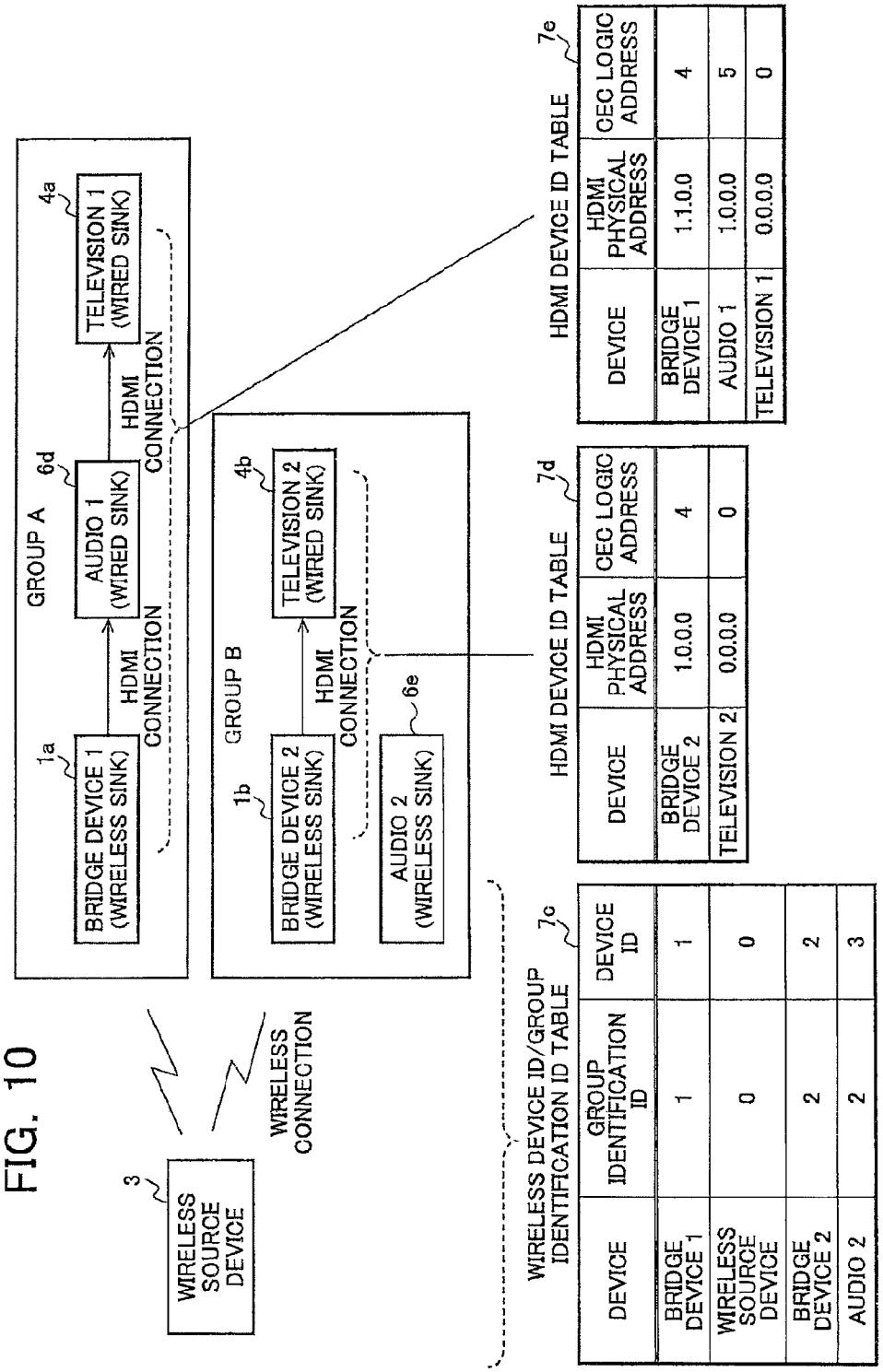
FIG. 10 is a diagram of an exemplary configuration of a wireless transmission system according to a second embodiment of the present invention.

FIG. 10 is a diagram of an exemplary configuration of a wireless transmission system according to the second embodiment of the present invention. Bridge devices 1a and 1b have the apparatus configuration depicted in FIG. 1 and televisions 4a and 4b have the apparatus configuration depicted in FIG. 3(A). Audios 6d and 6e are, for example, audio output devices such as speakers and AV amplifiers and are made up of a wireless connecting portion, a control portion, a wireless device control driver, a device control manager, a wireless device ID/group identification ID table, and an audio output portion.

In this embodiment, as described above, the content transmitting apparatus is made up of the wireless source device 3, and the group A is made up of the bridge device 1a that is a wireless sink device, and the audio 6d and the television 4a that are HDMI-connected to the bridge device 1a. The group B is made up of the bridge device 1b that is a wireless sink device, the television 4b that is HDMI-connected to the bridge device 1b, and the audio 6e that is a wireless sink device. In this case, the wireless source device 3 is wirelessly connected to the bridge devices 1a, 1b, and the audio 6e.

Both the groups A and B of this example include wireless sink devices and wired sink devices. In the group A, the bridge device 1a, the audio 6d, and the television 4a are HDMI-connected; the bridge device 1a is a wireless sink device; and the audio 6d and the television 4a are wired sink devices. Similarly, in the group B, the television 4b is HDMI-connected to the bridge device 1b; the bridge device 1b and the audio 6e are wireless sink devices; and the television 4b is a wired sink device. The audio 6d in the group A is prescribed as a repeater device having functions of both a source device and a sink device in the HDMI standard.

The wireless source device 3 includes a wireless device ID/group identification ID table 7c; the bridge device 1a includes the wireless device ID/group identification ID table 7c and an HDMI device ID table 7e; the bridge device 1b includes the wireless device ID/group identification ID table 7c and an HDMI device ID table 7d; the audio 6e includes the wireless device ID/group identification ID table 7c; the television 4a and the audio 6d include the HDMI device ID table 7e; and the television 4b includes the HDMI device ID table 7d. A method of generating these tables 7c to 7e will be described later with reference to FIG. 11.

In the case of the second form, the bridge devices 1a, 1b, and the audio 6e which are wireless sink devices receive a control command wirelessly transmitted from the content transmitting apparatus (the wireless source device 3) if their own group identification ID is added to the control command.

If wired sink devices such as a television and an audio are HDMI-connected to the bridge device, the bridge device transmits this control command as a CEC message to the wired sink devices. As a result, the sink devices belonging to the same group can be operated in conjunction with each other based on the control command received by the wireless sink devices 1a, 1b, and the audio 6e.

The audio 6e is a wireless sink device and includes the wireless device ID/group identification ID table 7c depicted in FIG. 10 and, therefore, if its own group identification ID is added to a control command wirelessly transmitted from another wireless sink device (the bridge device 1b) belonging to the same group, the audio 6e can receive the control command. Since the bridge device 1b transmits the control command as a CEC message to the television 4b, the sink devices belonging to the same group can be operated in conjunction with each other even if wired transmission and wireless transmission are mixed in the system.

Figure 11:
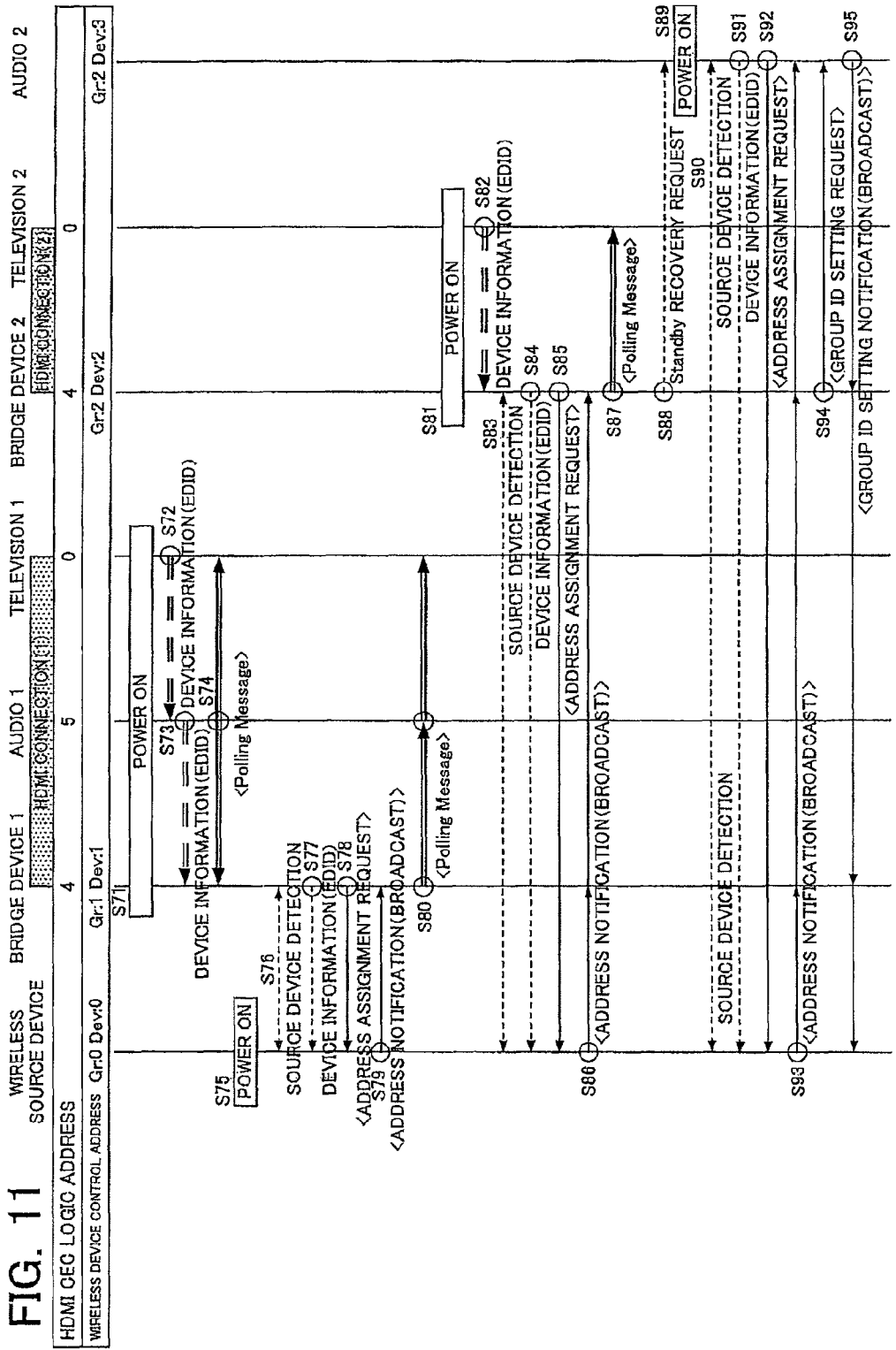
FIG. 11 is a diagram of an example of a sequence at the time of power-on in the wireless transmission system according to the second embodiment of the present invention.

FIG. 11 is a diagram of an example of a sequence at the time of power-on in the wireless transmission system according to the second embodiment of the present invention. This sequence example corresponds to the system configuration of FIG. 10 and will be described by exemplarily illustrating the bridge device 1 generating the HDMI device ID tables 7d, 7e, and the wireless device ID/group identification ID table 7c depicted in FIG. 10. It is assumed that the wireless source device 3, the bridge device 1a, the audio 6d, the television 4a, the bridge device 1b, the television 4b, and the audio 6e of FIG. 10 respectively correspond to a wireless source device, a bridge device 1, an audio 1, a television 1, a bridge device 2, a television 2, and an audio 2 of FIG. 11.

First, when the bridge device 1, the audio 1, and the television 1 are powered on (S71), the television 1 transmits the physical address (0.0.0.0) as device information to the bridge device 1 through the HDMI connection (S72). The audio 1 transmits the physical address (1.0.0.0) as device information to the bridge device 1 through the HDMI connection (S73). As a result, the physical address of the bridge device 1 is determined as (1.1.0.0); the physical address of the television 1 is determined as (0.0.0.0); and the physical address of the audio 1 is determined as (1.0.0.0). The audio 1 transmits the logic address "5" of an audio device through a CEC message <Polling Message> so as to declare that the audio device 1 is an audio device (S74). If this causes no Ack, the address is decided without change.

When the wireless source device is powered on (S75), the group identification ID and the device ID of the wireless source device are set to "0", respectively, by default. The bridge device 1 detects the presence of the wireless source device (S76) and transmits the device information of the bridge device 1 to the wireless source device (S77). The bridge device 1 transmits to the wireless source device a wireless control command that requests address assignment (S78) and the wireless source device performs broadcast transmission of a wireless control command for notification of address (S79). As a result, the bridge device 1 acquires the group identification ID "1" and the device ID "1" as an address.

The bridge device 1 transmits the logic address "4" of a reproducing device through a CEC message <Polling Message> to the audio 1 and the television 1, which are HDMI-connected, so as to declare that the wireless source device (reproducing device) is wirelessly connected (S80). If this causes no Ack, the address is decided without change.

When the bridge device 2 and the television 2 are powered on (S81), the television 2 transmits device information to the bridge device 2 (S82). As a result, the physical address of the television 2 is determined as (0.0.0.0) and the physical address of the bridge device 2 is determined as (1.0.0.0). When detecting the presence of the wireless source device (S83), the bridge device 2 transmits its own device information to the wireless source device (S84) and transmits an address assignment request to the wireless source device (S85). The wireless source device performs broadcast transmission of the address of the bridge device 2 in response to this address assignment request (S86). As a result, the bridge device 2 acquires the group identification ID "2" and the device ID "2" as an address.

The bridge device 2 transmits the logic address "4" of a reproducing device through a CEC message <Polling Message> to the HDMI-connected television 2 so as to declare that the wireless source device (reproducing device) is wirelessly connected (S87). If this causes no Ack, the address is decided without change.

The bridge device 2 transmits a request for recovery from standby state (power-on request) to the audio devices making up a group (S88). In this case, it is assumed that the bridge device 2 stores the MAC (Media Access Control) address of the audio 2 in advance and recognizes that this audio device is in the same group. The audio 2 is powered on in accordance with the request for recovery from the bridge device 2 (S89) and then detects the presence of the wireless source device (S90). The audio 2 transmits the device information to the wireless source device (S91).

The audio 2 transmits to the wireless source device a wireless control command that requests address assignment (S92) and the wireless source device performs broadcast transmission of a wireless control command for notification of address (S93). As a result, the audio 2 acquires the group identification ID "0 (default)" and the device ID "3" as an address. The bridge device 2 transmits to the audio 2 a wireless control command that requests setting of the group identification ID "2" (S94), and the audio 2 sets the group identification ID "2" in accordance with this request and then performs broadcast transmission of a group ID setting notification (S95).

In other words, when the bridge devices 1 and 2 are powered on, the wireless source device assigns the group identification ID to the bridge devices 1 and 2 (S79, S86), and the bridge device 2 groups the audio 2 based on the device identification information (such as MAC address) unique to the audio 2 and assigns the group identification ID to the grouped audio 2 (S94). This processing leads to the generation of the wireless device ID/group identification ID table 7c. For the wired sink devices that are HDMI-connected to the bridge devices 1 and 2, the logic addresses and the physical addresses are determined based on a predetermined processing in the HDMI standard to generate the HDMI device tables 7d and 7e.

The tables 7c to 7e depicted in FIG. 10 are generated in this way by the sequence described with reference to FIG. 11.

Figure 12:
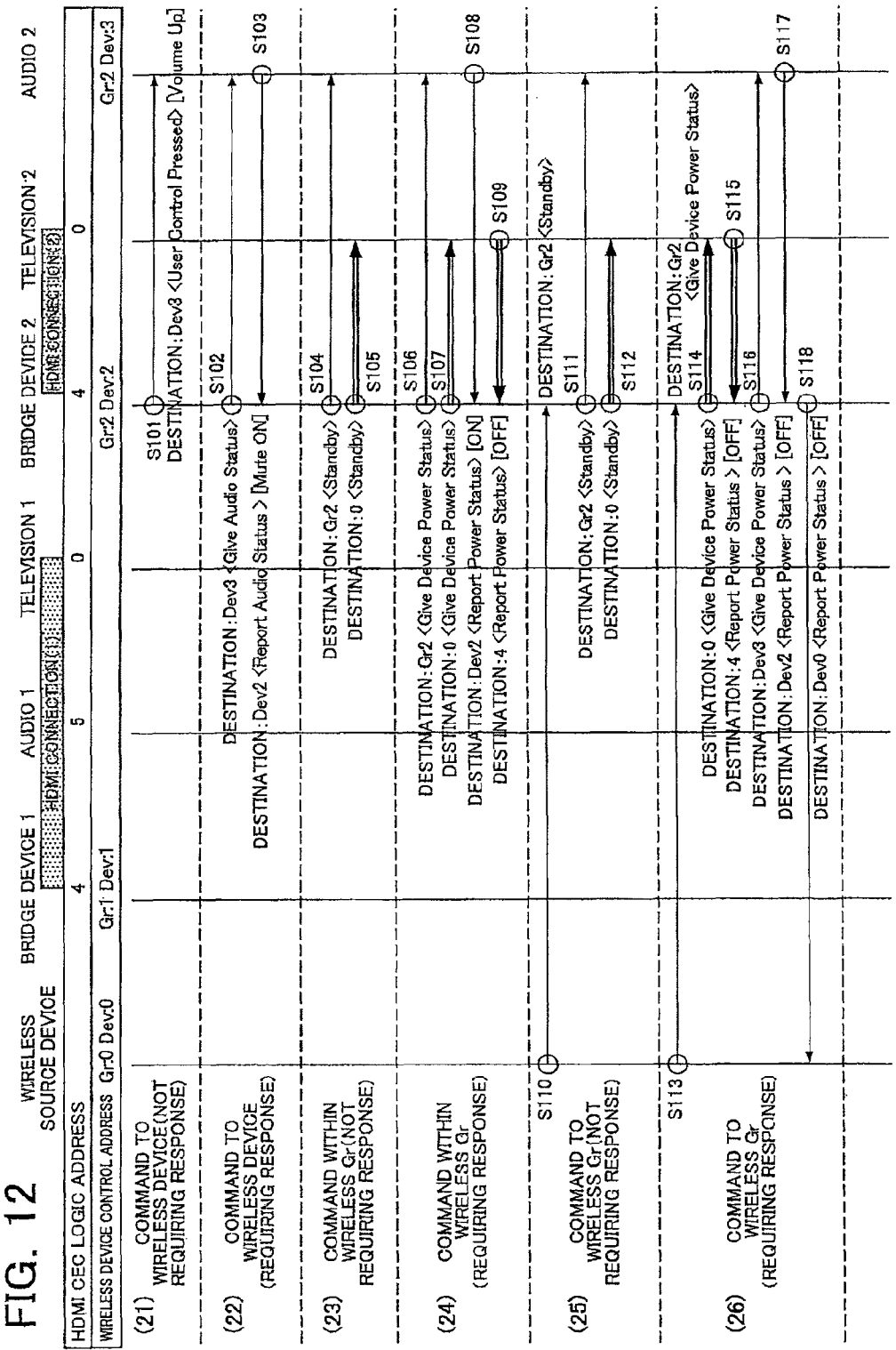
FIG. 12 is a diagram of an example of communication procedures in the wireless transmission system according to the second embodiment of the present invention.

FIG. 12 is a diagram of an example of communication procedures in the wireless transmission system according to the second embodiment of the present invention. The procedures of the following description are executed in the wireless transmission system depicted in FIG. 10 described above, based on the HDMI device ID tables 7d, 7e, and the wireless device ID/group identification ID table 7c. The communication procedures in the group A are exactly the same as the procedures of the HDMI connection and therefore will not be described.

A procedure (21) is a procedure in the case of transmitting a wireless control command (not requiring a response) to a wireless device and represents an example when the bridge device 2 performs the sound volume operation for the audio 2.

The bridge device 2 transmits a wireless control command <User Control Pressed> [Volume Up] for controlling a sound volume by designating the device ID "3" (Dev3) as the destination (S101). The audio 2 corresponding to the device ID "3" controls the sound volume in accordance with this wireless control command. Since a response is not required in this case, the audio 2 returns no response.

A procedure (22) is a procedure in the case of transmitting a wireless control command (requiring a response) to a wireless device and represents an example when the bridge device 2 makes a status inquiry to the audio 2. The bridge device 2 transmits a wireless control command <Give Audio Status> for inquiring about a status by designating the device ID "3" (Dev3) as the destination (S102). The audio 2 corresponding to the device ID "3" returns a wireless control command <Report Audio Status> [Mute ON] indicative of its own status as a response by designating the device ID "2" (Dev2) as the destination in accordance with this wireless control command (S103). Since a response is required in this case, the audio 2 returns a response.

A procedure (23) is a procedure in the case of transmitting a wireless control command (not requiring a response) to wireless devices within a group and represents an example when the bridge device 2 makes a standby request to the television 2 and the audio 2 in the same group. The bridge device 2 transmits a wireless control command <Standby> for making a standby request by designating the group identification ID "2" (Gr2) as the destination (S104). The bridge device 2 transmits a CEC message <Standby> to the HDMI-connected television 2 by designating the logic address "0" as the destination (S105). The audio 2 and the television 2 make the shift to the standby state in accordance with the wireless control command and the CEC message. Since a response is not required in this case, the television 2 and the audio 2 return no response.

A procedure (24) is a procedure in the case of transmitting a wireless control command (requiring a response) to wireless devices within a group and represents an example when the bridge device 2 makes an inquiry about a power status to the television 2 and the audio 2. The bridge device 2 transmits a wireless control command <Give Device Power Status> for inquiring about a power status by designating the group identification ID "2" (Gr2) as the destination (S106). The bridge device 2 transmits a CEC message <Give Device Power Status> to the HDMI-connected television 2 by designating the logic address "0" as the destination (S107).

The audio 2 corresponding to the group identification ID "2" returns a wireless control command <Report Power Status> [ON] indicative of its own power status as a response by designating the device ID "2" (Dev2) as the destination in accordance with the wireless control command (S108). The television 2 returns a wireless control command <Report Power Status> [OFF] indicative of its own power status as a response by designating the logical address "4" as the destination in accordance with the CEC message (S109). Since a response is required in this case, the television 2 and the audio 2 return responses.

A procedure (25) is a procedure in the case of transmitting a control command (not requiring a response) to devices within a group and represents an example when the wireless source device makes a standby request to the television 2 and the audio 2 in the group B (group identification ID "2"). The wireless source device transmits a wireless control command <Standby> for making a standby request by designating the group identification ID "2" (Gr2) as the destination (S110). In this example, a wireless control command from the outside of the group is received only by the bridge device 2, which is the representative wireless sink device. The bridge device 2 transfers the wireless control command <Standby> received from the wireless source device by designating the group identification ID "2" (Gr2) as the destination (S111). The bridge device 2 transmits a CEC message <Standby> to the HDMI-connected television 2 by designating the logic address "0" as the destination (S112). The audio 2 and the television 2 make the shift to the standby state in accordance with the wireless control command and the CEC message. Since a response is not required in this case, the television 2 and the audio 2 belonging to the group B return no response.

A procedure (26) is a procedure in the case of transmitting a wireless control command (requiring a response) to wireless devices within a group and represents an example when the wireless source device makes an inquiry about a power status to the television 2 and the audio 2 in the group B (group identification ID "2"). The wireless source device transmits a wireless control command <Give Device Power Status> for inquiring about a power status by designating the group identification ID "2" (Gr2) as the destination (S113). In this example, a wireless control command from the outside of the group is received only by the bridge device 2, which is the representative wireless sink device.

The bridge device 2 transmits a CEC message <Give Device Power Status> to the HDMI-connected television 2 by designating the logic address "0" as the destination (S114). The television 2 returns a wireless control command <Report Power Status> [OFF] indicative of its own power status as a response by designating the logical address "4" as the destination in accordance with the CEC message (S115). The bridge device 2 transfers the wireless control command <Give Device Power Status> received from the wireless source device by designating the device ID "3" (Dev3) as the destination (S116). The audio 2 corresponding to the device ID "3" returns a wireless control command <Report Power Status> [OFF] indicative of its own power status as a response by designating the device ID "2" (Dev2) as the destination in accordance with this wireless control command (S117). Since a response is required in this case, the television 2 and the audio 2 return responses.

The bridge device 2 corresponding to the logic address "4" of the HDMI connection and the device ID "2" of the wireless connection integrates a plurality of responses received from the television 2 and the audio 2 into one response based on the response returning rule described above and specifies the device ID "0" (Dev0) to return this response (S118). The wireless source device corresponding to the device ID "0" receives this response.

Figure 13:
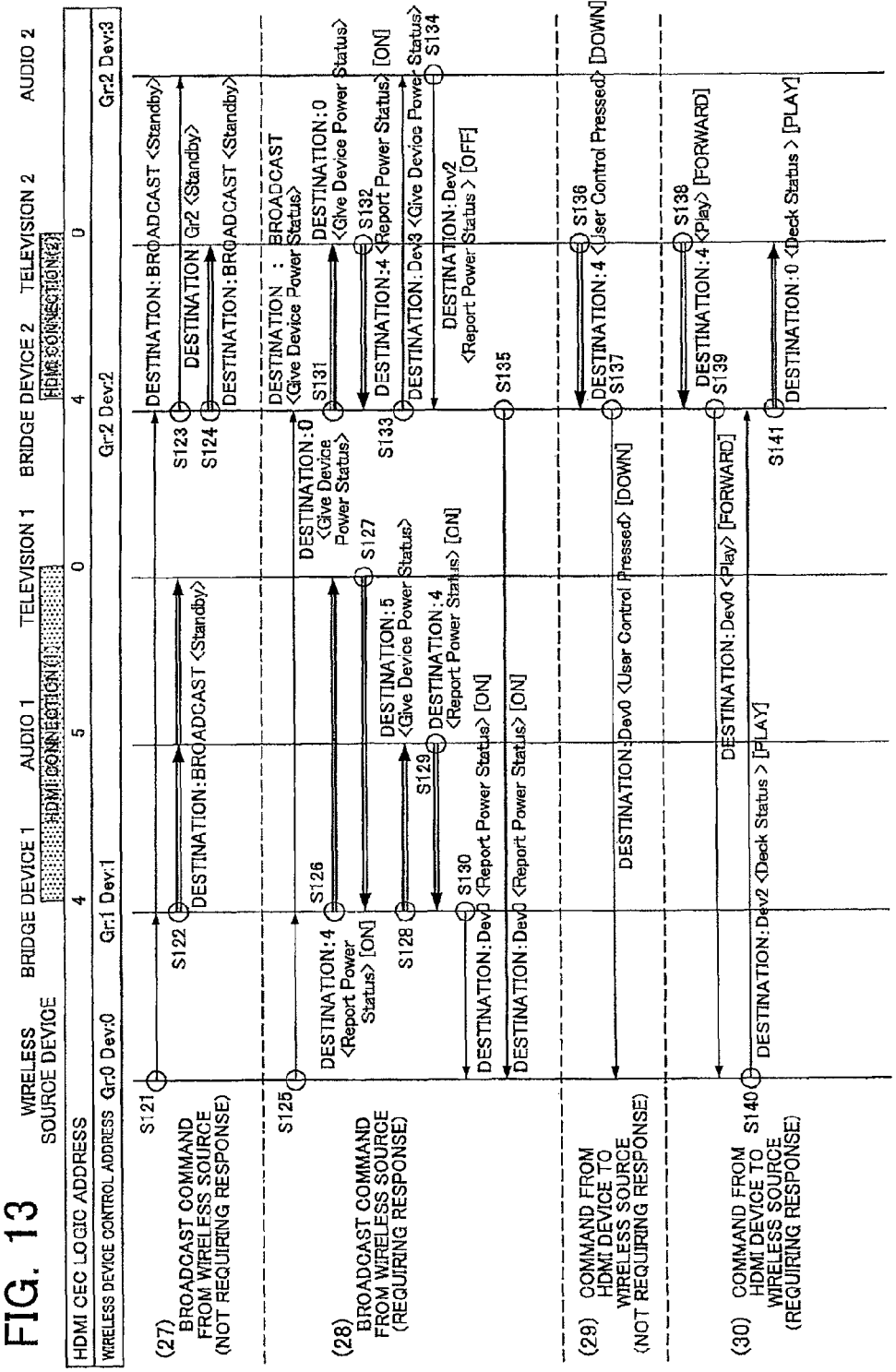
FIG. 13 is a diagram of another example of communication procedures in the wireless transmission system according to the second embodiment of the present invention.

FIG. 13 is a diagram of another example of communication procedures in the wireless transmission system according to the second embodiment of the present invention. The procedures of the following description are executed in the wireless transmission system depicted in FIG. 10 described above, based on the HDMI device ID tables 7d, 7e, and the wireless device ID/group identification ID table 7c.

A procedure (27) is a procedure in the case of performing broadcast transmission of a wireless control command (not requiring a response) from the wireless source device and represents an example when the wireless source device makes a standby request to the devices of the groups A and B. The wireless source device performs the broadcast transmission of the wireless control command <Standby> for making a standby request without specifying destinations (S121). In this example, the broadcast-transmitted wireless control command <Standby> is received only by the bridge devices 1 and 2, which are the representative wireless sink devices of the groups A and B.

In the group A, the bridge device 1 converts this wireless control command into a CEC message and performs the broadcast transmission of the converted CEC message <Standby> without specifying destinations (S122). In the group B, the bridge device 2 transfers this wireless control command <Standby> by designating the group identification ID "2" (Gr2) as the destination (S123). The bridge device 2 converts this wireless control command into a CEC message and performs the broadcast transmission of the converted CEC message <Standby> without specifying destinations (S124).

The devices of the groups A and B make the shift to the standby state in accordance with the wireless control command broadcast-transmitted from the wireless source device. Since a response is not required in this case, the devices belonging to the groups A and B return no response.

A procedure (28) is a procedure in the case of transmitting a wireless control command (requiring a response) from the wireless source device and represents an example when the wireless source device makes an inquiry about a power status to the devices of the groups A and B. The wireless source device performs the broadcast transmission of the wireless control command <Give Device Power Status> for inquiring about a power status without specifying destinations (S125). In this example, the broadcast-transmitted wireless control command <Give Device Power Status> is received only by the bridge devices 1 and 2, which are the representative wireless sink devices of the groups A and B.

The bridge device 1 converts this wireless control command into a CEC message and transmits the converted CEC message <Give Device Power Status> by designating the logic address "0" as the destination (S126). The television 1 corresponding to this logic address returns a wireless control command <Report Power Status> [ON] indicative of its own power status as a response by designating the logic address "4" as the destination (S127). Similarly, the bridge device 1 transmits the CEC message <Give Device Power Status> by designating the logic address "5" as the destination (S128). The audio 1 corresponding to this logic address returns a wireless control command <Report Power Status> [ON] indicative of its own power status as a response by designating the logic address "4" as the destination (S129).

The bridge device 1 corresponding to the logic address integrates a plurality of the responses received from the television 1 and the audio 1 into one response based on the response returning rule described above and specifies the device ID "0" (Dev0) to return this response (S130). The wireless source device corresponding to the device ID "0" receives this response.

The bridge device 2 converts the wireless control command from the wireless control command into a CEC message and transmits the converted CEC message <Give Device Power Status> by designating the logic address "0" as the destination (S131). The television 2 corresponding to this logic address returns a wireless control command <Report Power Status> [ON] indicative of its own power status as a response by designating the logic address "4" as the destination (S132). The bridge device 2 transmits the wireless control command <Give Device Power Status> by designating the device ID "3" (Dev3) as the destination (S133). The audio 2 corresponding to this device ID "3" returns a wireless control command <Report Power Status> [OFF] indicative of its own power status as a response by designating the device ID "2" (Dev2) as the destination (S134).

The bridge device 2 integrates a plurality of the responses received from the television 2 and the audio 2 into one response based on the response returning rule described above and specifies the device ID "0" (Dev0) to return this response (S135). The wireless source device corresponding to the device ID "0" receives this response. At S130 and S135, if one or more "ON" devices exits among the connected sink devices, "ON" is returned as a response; otherwise, "OFF" is returned.

A procedure (29) is a procedure in the case of transmitting a CEC message (not requiring a response) from an HDMI device in a group to the wireless source device and represents an example when a remote control signal is transmitted from the television 2 to the wireless source device. The television 2 transmits a CEC message <User Control Pressed> [DOWN] of the remote control signal by designating the logic address "4" as the destination (S136). The bridge device 2 corresponding to this logic address converts the CEC message <User Control Pressed> [DOWN] from the television 2 into a wireless control command and transmits the converted wireless control command <User Control Pressed> [DOWN] by designating the device ID "0" as the destination (S137). The wireless source device corresponding to this device ID "0" receives the wireless control command from the bridge device 2.

A procedure (30) is a procedure in the case of transmitting a CEC message (requiring a response) from an HDMI device in a group to the wireless source device and represents an example when a reproduction request is transmitted from the television 2 to the wireless source device. The television 2 transmits a CEC message <Play> [FORWARD] of the reproduction request signal by designating the logic address "4" as the destination (S138). The bridge device 2 corresponding to this logic address converts the CEC message <Play> [FORWARD] from the television 2 into a wireless control command and transmits the converted wireless control command <Play> [FORWARD] by designating the device ID "0" as the destination (S139).

The wireless source device corresponding to this device ID "0" transmits a wireless control command <Deck Status> [PLAY] as a response to the wireless control command from the bridge device 2 by designating the device ID "2" as the destination (S140). The bridge device 2 corresponding to this device ID "2" converts this wireless control command into a CEC message and transfers the converted CEC message <Deck Status> [PLAY] by designating the logic address "0" as the destination (S141). The television 2 corresponding to this logic address receives this response.

As described above, since the present invention enables a plurality of sink devices to be grouped and operated in conjunction with each other in the wireless AV transmission and eliminates the need to separately transmit the control command to each of the devices by transmitting the control command to a group, a transmission amount of the control command can be reduced and the timing of arrival of the control command can be matched at the devices.

Even between different transmission modes of wired transmission and wireless transmission, the control command can mutually be converted by including an ID table corresponding to wireless transmission and wired transmission in a bridge device (relay device). For example, a wireless device can be operated even from an HDMI device without any discomfort.

Even in a system connected to a plurality of sink devices (a television and one or more speakers), the sink devices can be controlled as is the case with a conventional system having one sink device.

EXPLANATIONS OF REFERENCE NUMERALS

1 . . . relay device (bridge device); 2 . . . wired (HDMI) source device; 3 . . . wireless source device; 4 . . . wired (HDMI) sink device; 5 . . . wireless sink device; 6 . . . audio device; 7a, 7d, 7e, 17, 26, 46 . . . HDMI device ID table; 7b, 7c, 18, 36, 56 . . . wireless device ID/group identification ID table; 8 . . . transmission packet; 11, 23, 41 . . . wired connecting portion; 12, 22, 32, 42, 52 . . . control portion; 13, 33, 51 . . . wireless connecting portion; 14, 24, 44 . . . HDMI CEC driver; 15, 34, 54 . . . wireless device control driver; 16, 25, 35, 45, 55 . . . device control manager; 21, 31 . . . BD portion; 27, 37, 47, 57 . . . operating portion; and 43, 53 . . . displaying portion.

The invention claimed is:

1. A wireless transmission system comprising: a content transmitting apparatus that wirelessly transmits AV contents including video and/or audio; and a plurality of sink devices that receive the wirelessly transmitted AV contents, at least one of the plurality of the sink devices being made up of a wireless sink device, wherein the content transmitting apparatus includes a group identification ID table that stores group identification ID for identifying a group made up of the plurality of the sink devices, a group identification ID adding portion that adds group identification ID extracted from the group identification ID table to a control command controlling the plurality of the sink devices, and a wireless transmitting portion that wirelessly transmits the control command with the group identification ID added, the wireless sink device receives a control command wirelessly transmitted from the content transmitting apparatus if its own group identification ID is added to the control command, any one of the wireless sink devices belonging to the same group is defined as a representative wireless sink device, and the representative wireless sink device wirelessly communicates with the content transmitting apparatus or a representative wireless sink device of another group on behalf of the group to which the representative wireless sink device belongs, if a control command is broadcast-transmitted from the content transmitting apparatus, the representative wireless sink device receives the control command, integrates a plurality of responses of other sink devices within the group to which the representative wireless sink device belongs into one response based on a predetermined rule, and returns the integrated response to the content transmitting apparatus, and in the case of a control command for inquiry about ON/OFF status, if one or more devices are "ON" among sink devices connected to the representative wireless sink devices, the predetermined rules is to return "ON" as the integrated response.

* * * * *